(12) United States Patent
Shiodera et al.

(10) Patent No.: US 10,999,597 B2
(45) Date of Patent: *May 4, 2021

(54) IMAGE ENCODING METHOD AND IMAGE DECODING METHOD

(71) Applicant: KABUSHIKI KAISHA TOSHIBA, Minato-ku (JP)

(72) Inventors: Taichiro Shiodera, Tokyo (JP); Saori Asaka, Tokyo (JP); Akiyuki Tanizawa, Kawasaki (JP); Takeshi Chujoh, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,734

(22) Filed: Jun. 2, 2020

(65) Prior Publication Data
US 2020/0296413 A1 Sep. 17, 2020

Related U.S. Application Data

(63) Continuation of application No. 15/698,336, filed on Sep. 7, 2017, now Pat. No. 10,715,828, which is a (Continued)

(51) Int. Cl.
*H04N 19/513* (2014.01)
*H04N 19/105* (2014.01)
(Continued)

(52) U.S. Cl.
CPC ......... *H04N 19/521* (2014.11); *H04N 19/105* (2014.11); *H04N 19/109* (2014.11);
(Continued)

(58) Field of Classification Search
CPC .. H04N 19/521; H04N 19/105; H04N 19/137; H04N 19/109; H04N 19/159;
(Continued)

(56) References Cited

U.S. PATENT DOCUMENTS

| | | |
|---|---|---|
| 7,023,916 B1 | 4/2006 | Pandel |
| 7,233,621 B2 | 6/2007 | Jeon |

(Continued)

FOREIGN PATENT DOCUMENTS

| | | | | |
|---|---|---|---|---|
| CA | 2969723 A1 | 12/2010 | | |
| CA | 2969723 C | * 8/2019 | ........... | H04N 19/139 |

(Continued)

OTHER PUBLICATIONS

International Search Report dated Jul. 13. 2010 for PCT/JP2010/056400 filed on Apr. 8. 2010 (with English translation).

(Continued)

*Primary Examiner* — Loi H Tran
(74) *Attorney, Agent, or Firm* — Oblon, McClelland, Maier & Neustadt, L.L.P.

(57) ABSTRACT

According to one embodiment, an image encoding method includes selecting a motion reference block from an already-encoded pixel block. The method includes selecting an available block including different motion information from the motion reference block, and selecting a selection block from the available block. The method includes generating a predicted image of the encoding target block using motion information of the selection block. The method includes encoding a prediction error between the predicted image and an original image. The method includes encoding selection information identifying the selection block by referring to a code table decided according to a number of the available block.

4 Claims, 32 Drawing Sheets

Related U.S. Application Data continuation of application No. 14/190,909, filed on Feb. 26, 2014, now Pat. No. 9,794,587, which is a continuation of application No. 13/647,124, filed on Oct. 8, 2012, now abandoned, which is a continuation of application No. PCT/JP2010/056400, filed on Apr. 8, 2010.

(51) Int. Cl.

| | | |
|---|---|---|
| *H04N 19/139* | (2014.01) | |
| *H04N 19/159* | (2014.01) | |
| *H04N 19/176* | (2014.01) | |
| *H04N 19/70* | (2014.01) | |
| *H04N 19/119* | (2014.01) | |
| *H04N 19/137* | (2014.01) | |
| *H04N 19/182* | (2014.01) | |
| *H04N 19/109* | (2014.01) | |
| *H04N 19/52* | (2014.01) | |
| *H04N 19/124* | (2014.01) | |
| *H04N 19/15* | (2014.01) | |
| *H04N 19/61* | (2014.01) | |
| *H04N 19/96* | (2014.01) | |

(52) U.S. Cl.
CPC ......... *H04N 19/119* (2014.11); *H04N 19/124* (2014.11); *H04N 19/137* (2014.11); *H04N 19/139* (2014.11); *H04N 19/15* (2014.11); *H04N 19/159* (2014.11); *H04N 19/176* (2014.11); *H04N 19/182* (2014.11); *H04N 19/52* (2014.11); *H04N 19/61* (2014.11); *H04N 19/70* (2014.11); *H04N 19/96* (2014.11)

(58) Field of Classification Search
CPC ...... H04N 19/61; H04N 19/70; H04N 19/119; H04N 19/176; H04N 19/124; H04N 19/15; H04N 19/182; H04N 19/52; H04N 19/139; H04N 19/96
USPC .................................................. 375/240.16
See application file for complete search history.

(56) References Cited

U.S. PATENT DOCUMENTS

| | | |
|---|---|---|
| 2002/0006162 A1 | 1/2002 | Nakao et al. |
| 2002/0094028 A1 | 7/2002 | Kimoto |
| 2003/0020677 A1 | 1/2003 | Nakano |
| 2003/0081675 A1 | 5/2003 | Sadeh et al. |
| 2003/0206583 A1 | 11/2003 | Srinivasan |
| 2004/0001546 A1 | 1/2004 | Tourapis et al. |
| 2004/0008784 A1 | 1/2004 | Kikuchi et al. |
| 2004/0013308 A1 | 1/2004 | Jeon et al. |
| 2004/0013309 A1 | 1/2004 | Choi et al. |
| 2004/0047418 A1 | 3/2004 | Tourapis et al. |
| 2004/0057515 A1 | 3/2004 | Koto et al. |
| 2004/0151252 A1 | 8/2004 | Sekiguchi et al. |
| 2004/0223548 A1* | 11/2004 | Kato ............... H04N 19/56 375/240.16 |
| 2004/0233990 A1 | 11/2004 | Sekiguchi |
| 2005/0041740 A1 | 2/2005 | Sekiguchi et al. |
| 2005/0117646 A1 | 6/2005 | Joch et al. |
| 2005/0123207 A1 | 6/2005 | Marpe |
| 2005/0147162 A1 | 7/2005 | Mihara |
| 2005/0201633 A1 | 9/2005 | Moon et al. |
| 2005/0207490 A1 | 9/2005 | Wang et al. |
| 2006/0013299 A1 | 1/2006 | Sato et al. |
| 2006/0045186 A1 | 3/2006 | Koto et al. |
| 2006/0188020 A1 | 8/2006 | Wang |
| 2006/0209960 A1 | 9/2006 | Katayama et al. |
| 2006/0280253 A1 | 12/2006 | Tourapis et al. |
| 2007/0014358 A1 | 1/2007 | Tourapis et al. |
| 2007/0019726 A1 | 1/2007 | Cha et al. |
| 2007/0086525 A1 | 4/2007 | Asano |
| 2007/0121731 A1 | 5/2007 | Tanizawa et al. |
| 2007/0146380 A1 | 6/2007 | Nystad et al. |
| 2007/0160140 A1 | 7/2007 | Fujisawa et al. |
| 2007/0206679 A1 | 9/2007 | Lim |
| 2007/0211802 A1 | 9/2007 | Kikuchi et al. |
| 2008/0002770 A1 | 1/2008 | Ugur |
| 2008/0008242 A1 | 1/2008 | Lu et al. |
| 2008/0031328 A1 | 2/2008 | Kimoto |
| 2008/0037657 A1 | 2/2008 | Srinivasan |
| 2008/0043842 A1 | 2/2008 | Nakaishi |
| 2008/0101474 A1 | 5/2008 | Chiu et al. |
| 2008/0117976 A1 | 5/2008 | Lu et al. |
| 2008/0152000 A1 | 6/2008 | Kaushik |
| 2008/0159401 A1 | 7/2008 | Lee et al. |
| 2008/0181309 A1 | 7/2008 | Lee et al. |
| 2008/0273599 A1 | 11/2008 | Park et al. |
| 2009/0003446 A1 | 1/2009 | Wu et al. |
| 2009/0010553 A1 | 1/2009 | Sagawa |
| 2009/0022228 A1 | 1/2009 | Wang et al. |
| 2009/0034618 A1 | 2/2009 | Fu et al. |
| 2009/0052543 A1 | 2/2009 | Wu |
| 2009/0074077 A1 | 3/2009 | Lakus-Becker |
| 2009/0110077 A1 | 4/2009 | Amano et al. |
| 2009/0245376 A1 | 10/2009 | Choi et al. |
| 2009/0290643 A1 | 11/2009 | Yang |
| 2009/0304084 A1* | 12/2009 | Hallapuro ............ H04N 19/593 375/240.16 |
| 2009/0310682 A1 | 12/2009 | Chono |
| 2010/0027655 A1 | 2/2010 | Matsuo et al. |
| 2010/0061447 A1 | 3/2010 | Tu et al. |
| 2010/0080296 A1* | 4/2010 | Lee ..................... H04N 19/70 375/240.16 |
| 2010/0086052 A1 | 4/2010 | Park et al. |
| 2010/0135387 A1 | 6/2010 | Divorra Escoda |
| 2010/0142617 A1 | 6/2010 | Koo et al. |
| 2010/0158129 A1 | 6/2010 | Lai |
| 2010/0177824 A1 | 7/2010 | Koo et al. |
| 2010/0195723 A1 | 8/2010 | Ikai et al. |
| 2010/0239002 A1 | 9/2010 | Park et al. |
| 2011/0038420 A1 | 2/2011 | Lee et al. |
| 2011/0044550 A1 | 2/2011 | Tian et al. |
| 2011/0080954 A1 | 4/2011 | Bossen et al. |
| 2011/0129016 A1 | 6/2011 | Sekiguchi et al. |
| 2011/0176615 A1 | 7/2011 | Lee et al. |
| 2011/0194609 A1 | 8/2011 | Rusert |
| 2011/0206119 A1 | 8/2011 | Bivolarsky et al. |
| 2011/0206132 A1 | 8/2011 | Bivolarsky et al. |
| 2011/0211640 A1 | 9/2011 | Kim et al. |
| 2011/0222601 A1 | 9/2011 | Suzuki et al. |
| 2011/0286523 A1 | 11/2011 | Dencher |
| 2012/0044990 A1 | 2/2012 | Bivolarsky et al. |
| 2012/0128073 A1 | 5/2012 | Asaka et al. |
| 2012/0147966 A1 | 6/2012 | Lee et al. |
| 2012/0169519 A1 | 7/2012 | Ugur |
| 2012/0281764 A1 | 11/2012 | Lee et al. |
| 2013/0028328 A1 | 1/2013 | Shiodera et al. |
| 2013/0058415 A1 | 3/2013 | Lee et al. |
| 2013/0148737 A1 | 6/2013 | Tourapis et al. |
| 2013/0279593 A1 | 10/2013 | Lee et al. |
| 2013/0279594 A1 | 10/2013 | Lee et al. |
| 2014/0016705 A1 | 1/2014 | Lee et al. |
| 2014/0177727 A1 | 6/2014 | Asaka |
| 2014/0185685 A1 | 7/2014 | Asaka |
| 2017/0171558 A1 | 6/2017 | Huang et al. |

FOREIGN PATENT DOCUMENTS

| | | |
|---|---|---|
| CN | 1471320 A | 1/2004 |
| CN | 1615656 A | 5/2005 |
| CN | 1692653 A | 11/2005 |
| CN | 1750658 A | 3/2006 |
| CN | 1889687 A | 1/2007 |
| CN | 1898964 A | 1/2007 |
| CN | 101023672 A | 8/2007 |
| CN | 101083770 A | 12/2007 |
| CN | 101099394 A | 1/2008 |
| CN | 101361370 A | 2/2009 |
| CN | 101573984 A | 11/2009 |

(56) References Cited

FOREIGN PATENT DOCUMENTS

| | | |
|---|---|---|
| CN | 101631247 A | 1/2010 |
| CN | 101631248 A | 1/2010 |
| EP | 0 579 319 A2 | 1/1994 |
| EP | 2149262 A1 | 2/2010 |
| EP | 2 677 753 A2 | 12/2013 |
| EP | 2 677 753 A3 | 12/2013 |
| JP | 6-168330 A | 6/1994 |
| JP | 8-18976 A | 1/1996 |
| JP | 10-224800 A | 8/1998 |
| JP | 2000-50279 A | 2/2000 |
| JP | 2004-23458 A | 1/2004 |
| JP | 2004-040785 A | 2/2004 |
| JP | 2004-56823 A | 2/2004 |
| JP | 2004-104159 A | 4/2004 |
| JP | 2004-165703 A | 6/2004 |
| JP | 2004-208259 A | 7/2004 |
| JP | 2005-124001 A | 5/2005 |
| JP | 4020789 | 10/2007 |
| JP | 2008-278091 A | 11/2008 |
| JP | 2010-010950 A | 1/2010 |
| JP | 2013-517669 A | 5/2013 |
| JP | 2013-517734 A | 5/2013 |
| JP | 5444497 B2 | 12/2013 |
| JP | 2014-90459 A | 5/2014 |
| JP | 2014-131293 A | 7/2014 |
| JP | 2014-131294 A | 7/2014 |
| JP | 2014-131295 A | 7/2014 |
| WO | WO 2006/052577 A2 | 5/2006 |
| WO | WO 2008/127597 A2 | 10/2008 |
| WO | WO 2008/133455 A1 | 11/2008 |
| WO | WO 2010/004939 A1 | 1/2010 |
| WO | WO 2010/146696 A1 | 12/2010 |
| WO | WO 2011/087321 A2 | 7/2011 |
| WO | WO 2011/090314 A2 | 7/2011 |
| WO | WO 2011/125211 A1 | 10/2011 |

OTHER PUBLICATIONS

International Written Opinion dated Jul. 13, 2010 for PCT/JP2010/056400 filed on Apr. 8, 2010.
Takeshi, Chujoh, Description of video coding technology proposal by Toshiba, Joint Collaborative Team on Video Coding (JCT-VC) of ITU-T SG16 WP3 and ISO/IEC JTC1/SC29/WG11, JCTVC-A117r1, Apr. 15, 2010, pp. 4-6.
ITU-T Rec.H.264 (Mar. 2005), Chap. 8.4.1 "Derivation process for motion vector components and reference indices".
Japanese Office Action dated Apr. 2, 2013 in Patent Application No. 2012-509253 (with English translation).
English translation of the International Preliminary Report on Patentability dated Nov. 29, 2012, in PCT/JP2010/056400, filed Apr. 8, 2010.
Written Opinion of the International Searching Authority dated Jul. 13, 2010, in PCT/JP2010/056400. filed Apr. 8, 2010 (submitting English-language translation only. previously filed Oct. 8, 2012).
ITU-T Q-6/SG16 Document, VCEG-AC06, Joel Jung, Jul. 17, 2006, "Competition-Based Scheme for Motion Vector Selection and Coding".
Office Action dated Jan. 28, 2014 in Japanese Patent Application No. 2013-116884 (with English language translation).
Office Action dated Feb. 25, 2014 in Japanese Patent Application No. 2014-010560 with English language translation.
Office Action dated Feb. 25, 2014 in Japanese Patent Application No. 2014-010561 with English language translation.
Office Action dated Feb. 25, 2014 in Japanese Patent Application No. 2014-010562 with English language translation.
Extended European Search Report dated Jun. 17, 2014 in Patent Application No. 10849496.4.
Guillaume Laroche, et al., "RD optimized coding for motion vector predictor selection", IEEE Transactions on Circuits and Systems for Video Technology, vol. 18, No. 9, XP011231739, Sep. 2008, pp. 1247-1257.
"Video coding using extended block sizes", Qualcomm Inc., International Telecommunications Union, Telecommunications Standardization Sector, COM 16-C 123-E, XP030003764, Jan. 2009, pp. 1-4.
Sung Deuk Kim, et al., "An efficient motion vector coding scheme based on minimum bitrate prediction", IEEE Transactions on Image Processing, vol. 8, No. 8, XP011026355, Aug. 1999, pp. 1117-1120.
Japanese Office Action dated Jul. 29, 2014, in Japan Patent Application No. 2013-186629 (with English translation).
Combined Chinese Office Action and Search Report dated Sep. 23, 2014 in Patent Application No. 201080066017.7 (with English language translation).
Combined Office Action and Search Report dated Oct. 10, 2014 in Chinese Patent Application No. 201080066019.6 (with English translation).
Combined Chinese Office Action and Search Report dated Sep. 6, 2015 in Patent Application No. 201310142052.8 (with English translation).
Kemal Ugur, et al., "Appendix to Description of Video Coding Technology Proposal by Tandberg Nokia Ericsson", Joint Collaborative Team on Video Coding (JCT-VC) of ITU-T SG16 WP3 and ISO/IEC JTC1/SC29/WG11, No. JCTVC-A119. Apr. 2010, pp. 1-55.
Jungsun Kim, et al., "Encoding Complexity Reduction for Intra Prediction by Disabling NxN Partition", LG Electronics, Joint Collaborative Team on Video Coding (JCT-VC) of ITU-T SG16 WP3 and ISO/IEC JTC1/SC29/WG11, No. JCTVC-C218, Oct. 2010, pp. 1-5.
Combined Chinese Office Action and Search Report dated Jun. 24, 2016 in Patent Application No. 201410051546.X (with unedited computer generated English translation and English translation of categories of cited documents).
Combined Chinese Office Action and Search Report dated Jun. 26, 2016 in Patent Application No. 201410051029.2 (with unedited computer generated English translation and English translation of categories of cited documents).
Combined Chinese Office Action and Search Report dated Jul. 22, 2016 in Patent Application No. 201410051514.X (with unedited computer generated English translation and English translation of categories of cited documents).
Office Action dated Sep. 7, 2016 in U.S. Appl. No. 14/190,779.
Office Action dated Dec. 13, 2016 in European Patent Application No. 10849496.4.
"Test Model under Consideration", Joint Collaborative Team on Video Coding (JCT-VC) of ITU-T SG16 WP3 and ISO/IEC JTC1/SC29/WG11, 2nd Meeting, Document: JCTVC-B205, Jul. 21-28, 2010, 189 pages.
Seyoon Jeong et al., "TE11: Cross-check result of merge/skip (3.2c)", Joint Collaborative Team on Video Coding (JCT-VC) of ITU-T SG16 WP3 and ISO/IEC JTC1/SC29/WG11. 3rd Meeting, Document: JCTVC-C191, Oct. 7-15, 2010, with enclosures: 1) JCTVC-C191—Cross Check Result; 2) JCTVC-C191 Decoding Time r1, and 3) JCTVC-C191 Time Comparison, 28 pages.
U.S. Office Action dated Jan. 17, 2017, issued in U.S. Appl. No. 15/350,265.
Joel Jung et al.. "Competition-Based Scheme for Motion Vector Selection and Coding", ITU—Telecommunications Standardization Sector, Study Group 16, Question 6, Jul. 17-18, 2006, 8 pages with cover page.
Office Action dated Jan. 31, 2017 in Japanese Patent Application No. 2016-028133.
"Series H: Audiovisual and Multimedia Systems: Infrastructure of audiovisual services—Coding of moving video: High efficiency video coding" ITU-T Telecommunication Standardization Sector of ITU, H.265, Apr. 2013. 26 pages.
Takeshi Chujoh, et al., "Description of video coding technology proposal by Toshiba" Joint Collaborative Team on Video Coding (JCT-VC) of ITU-T SG16 WP3 and ISO/IEC JTC1/SC29/WG11, Apr. 2010, 6 pages.
Office Action dated Mar. 10, 2017 on co-pending U.S. Appl. No. 13/647,140.

(56) References Cited

OTHER PUBLICATIONS

Detlev Marpe, et al., "Context-Based Adaptive Binary Arithmetic Coding in the H.264/AVC Video Compression Standard" IEEE Transactions on Circuits and Systems for Video Technology, vol. 13, No. 7, Jul. 2003, pp. 620-636.
U.S. Office Action, dated Aug. 9, 2017 in U.S. Appl. No. 13/647,140.
European Office Action dated May 8, 2019 in European Patent Application No. 18 152 576.7-1208.
U.S. Office Action dated Jun. 3, 2019 in the related U.S. Appl. No. 14/190,779.
U.S. Office Action dated Jul. 11, 2019 in the related U.S. Appl. No. 16/250,430.

* cited by examiner

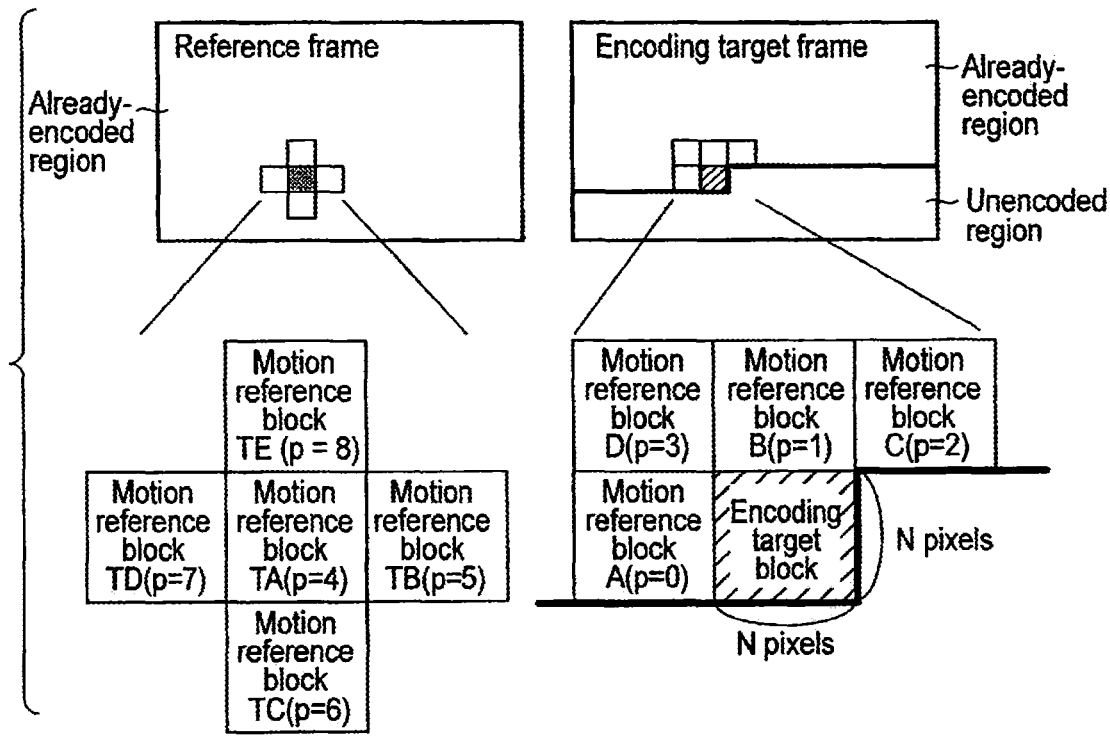
F I G. 8A
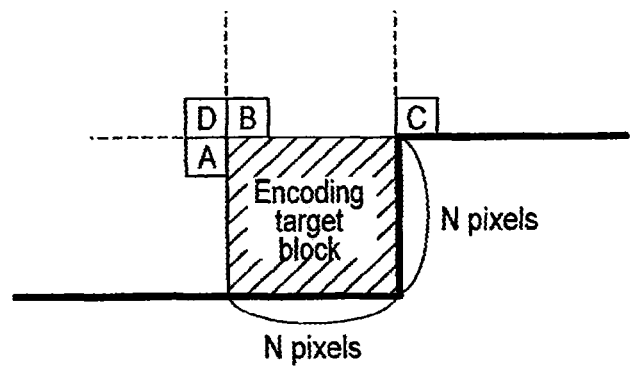
F I G. 8B

|   | dx | dy |
|---|----|----|
| a | -1 | 0  |
| b | 0  | -1 |
| c | N  | -1 |
| d | -1 | -1 |
FIG. 8C
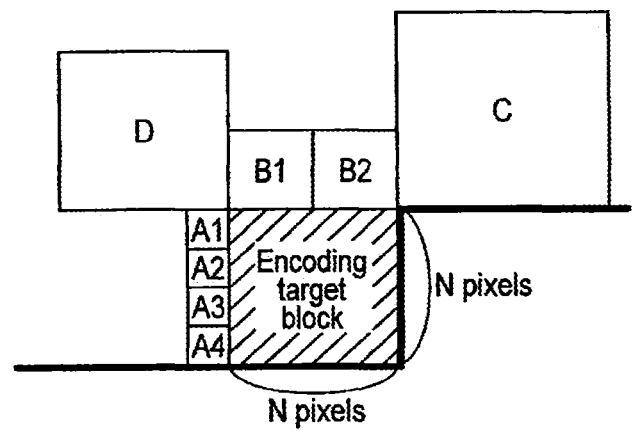
FIG. 8D
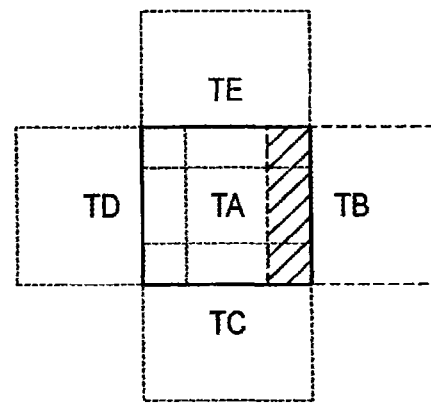
FIG. 8E

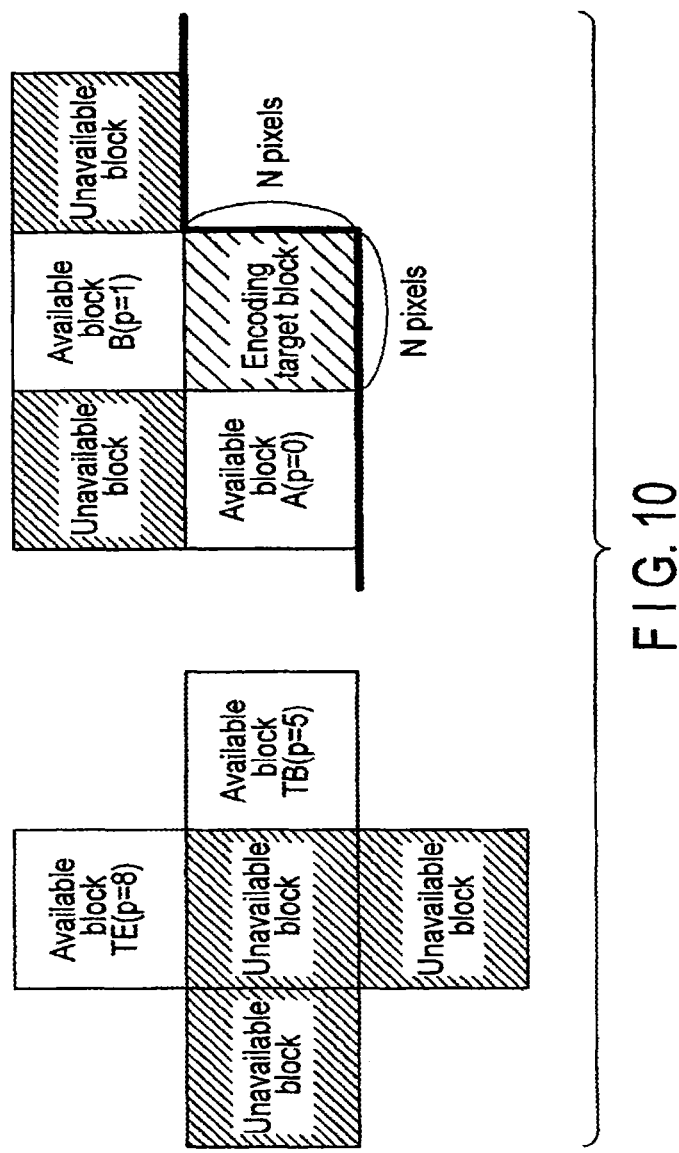
F I G. 10

| Index p | Availability | Motion reference block name (as reference) |
|---|---|---|
| 0 | Available | A |
| 1 | Available | B |
| 2 | Unavailable | C |
| 3 | Unavailable | D |
| 4 | Unavailable | TA |
| 5 | Available | TB |
| 6 | Unavailable | TC |
| 7 | Unavailable | TE |
| 8 | Available | TD |
F I G. 11
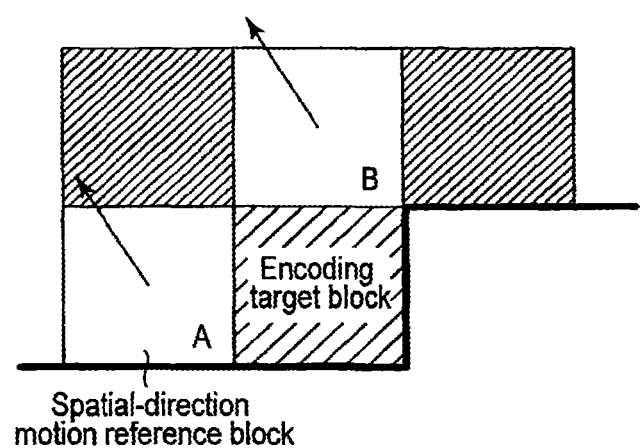
F I G. 12A

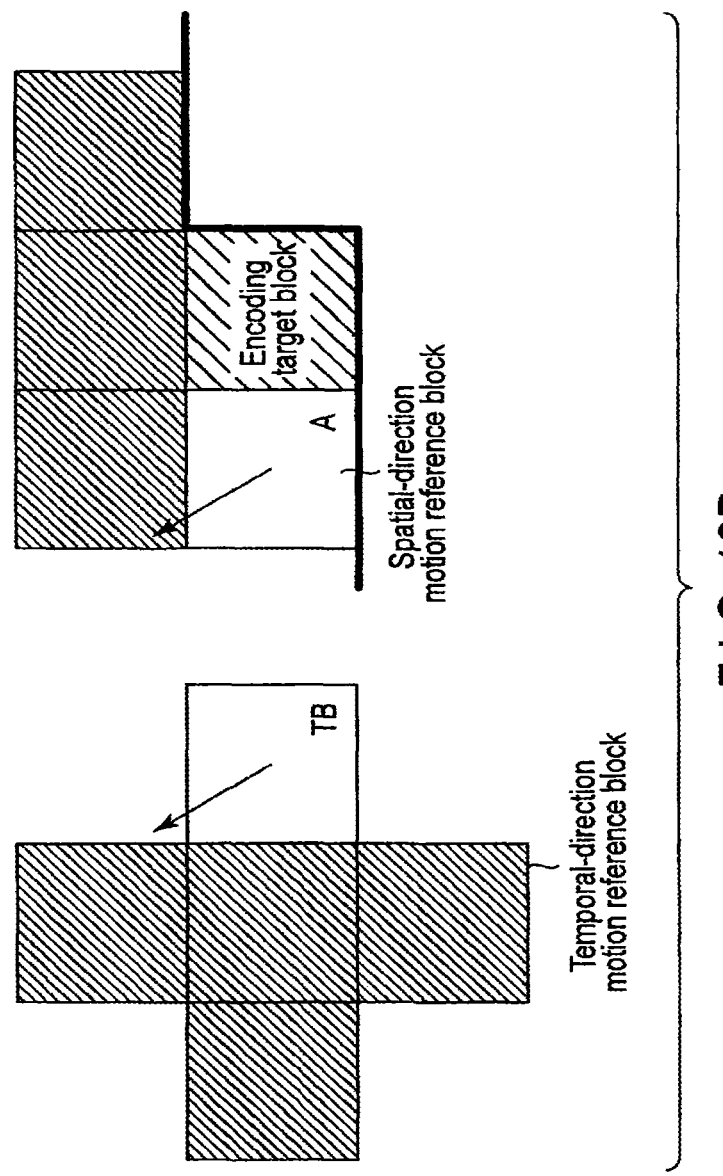

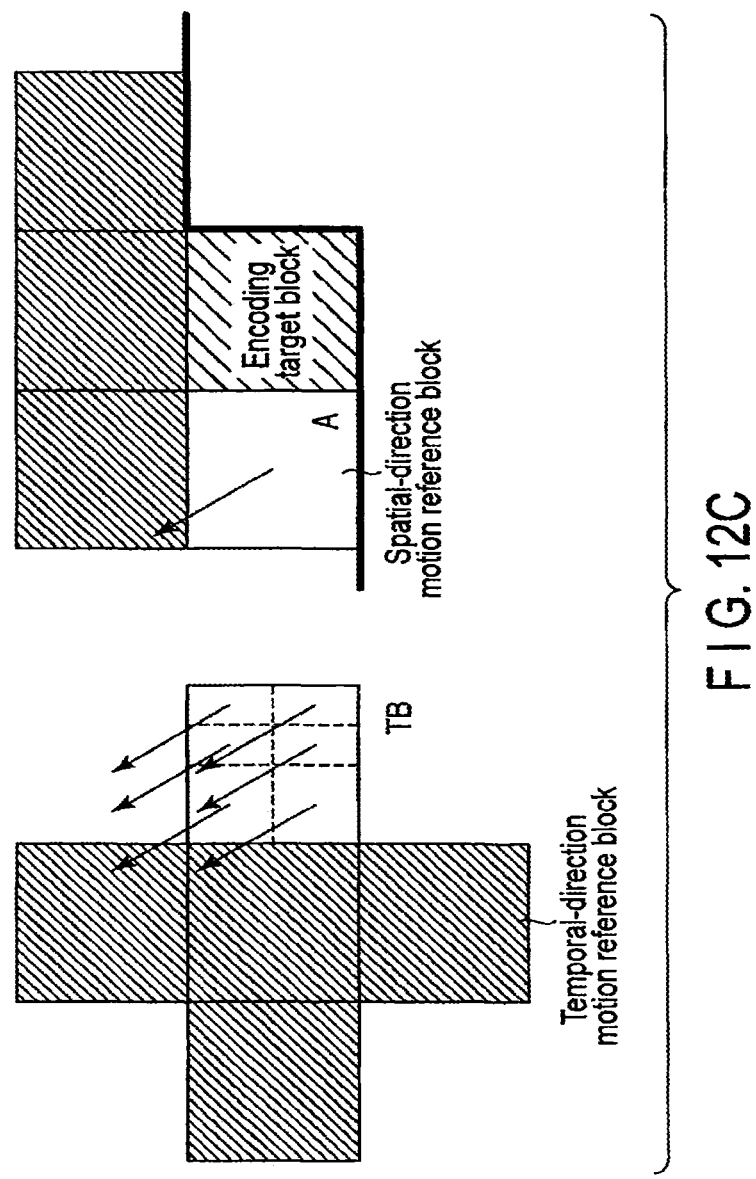
F I G. 12C

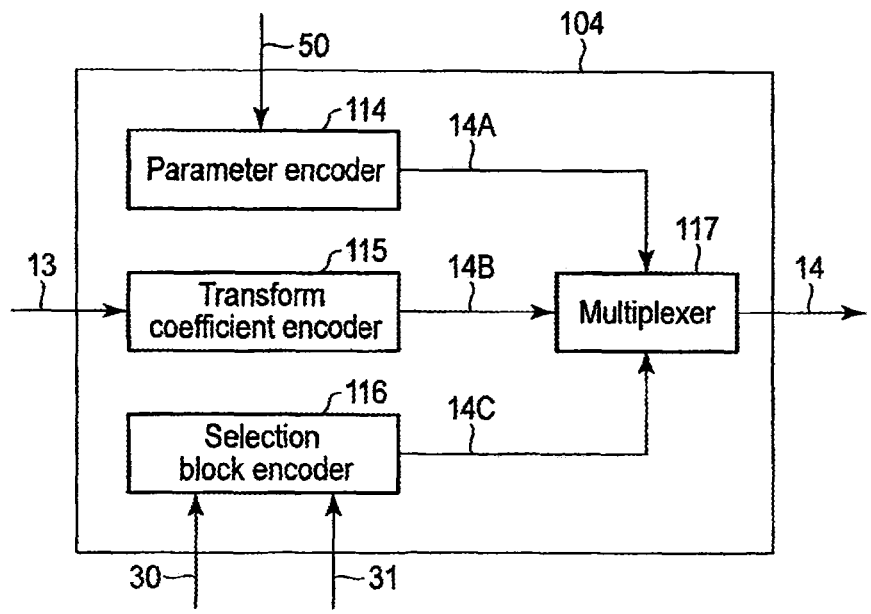
F I G. 18
| Index p | Availability | | Selection-block-information syntax |
|---|---|---|---|
| 0 | Available | ⇒ | 0 |
| 1 | Available | ⇒ | 1 |
| 2 | Unavailable | ⇒ | - |
| 3 | Unavailable | ⇒ | - |
| 4 | Unavailable | ⇒ | - |
| 5 | Available | ⇒ | 2 |
| 6 | Unavailable | ⇒ | - |
| 7 | Unavailable | ⇒ | - |
| 8 | Available | ⇒ | 3 |
F I G. 19

| | | Selection-block-information syntax stds_idx | | | | | | | | |
|---|---|---|---|---|---|---|---|---|---|---|
| | | 0 | 1 | 2 | 3 | 4 | 5 | 6 | 7 | 8 |
| The number of available blocks | 2 | 0 | 1 | - | - | - | - | - | - | - |
| | 3 | 0 | 10 | 11 | - | - | - | - | - | - |
| | 4 | 0 | 10 | 110 | 111 | - | - | - | - | - |
| | 5 | 0 | 10 | 110 | 1110 | 1111 | - | - | - | - |
| | 6 | 00 | 01 | 10 | 110 | 1110 | 1111 | - | - | - |
| | 7 | 00 | 01 | 100 | 101 | 110 | 1110 | 1111 | - | - |
| | 8 | 00 | 01 | 100 | 101 | 110 | 1110 | 11110 | 11111 | - |
| | 9 | 00 | 01 | 100 | 101 | 110 | 1110 | 11110 | 111110 | 111111 |
F I G. 20
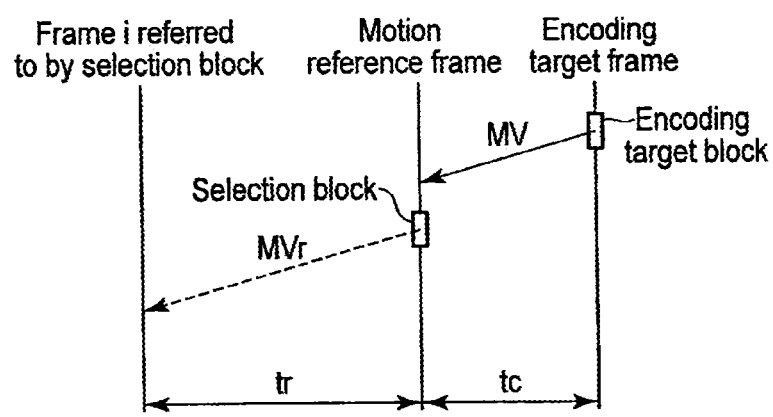
F I G. 21

```
macroblock_layer() {
  ...
  mb_type
  if(mb_type==TARGET_MODE) {
    if(available_block_num>1)
      stds_idx
  }
  ...
}
```

```
macroblock_layer() {
  ...
  mb_skip_flag
  if(available_block_num>1)
    stds_idx
  if(available_block_num>0)
    mb_type
```

| mb_type | mb_type (name) | bin | | | | | | |
|---|---|---|---|---|---|---|---|---|
| 0 | B_Direct_NxN | 0 | | | | | | |
| 1 | B_L0_NxN | 1 | 0 | 0 | | | | |
| 2 | B_L1_NxN | 1 | 0 | 1 | | | | |
| 3 | B_Bi_NxN | 1 | 1 | 0 | 0 | 0 | 0 | |
| 4 | B_L0_L0_NxM | 1 | 1 | 0 | 0 | 0 | 1 | |
| 5 | B_L0_L0_MxN | 1 | 1 | 0 | 0 | 1 | 0 | |
| 6 | B_L1_L1_NxM | 1 | 1 | 0 | 0 | 1 | 1 | |
| 7 | B_L1_L1_MxN | 1 | 1 | 0 | 1 | 0 | 0 | |
| 8 | B_L0_L1_NxM | 1 | 1 | 0 | 1 | 0 | 1 | |
| 9 | B_L0_L1_MxN | 1 | 1 | 0 | 1 | 1 | 0 | |
| 10 | B_L1_L0_NxM | 1 | 1 | 0 | 1 | 1 | 1 | |
| 11 | B_L1_L0_MxN | 1 | 1 | 1 | 1 | 1 | 0 | |
| 12 | B_L0_Bi_NxM | 1 | 1 | 1 | 0 | 0 | 0 | 0 |
| 13 | B_L0_Bi_MxN | 1 | 1 | 1 | 0 | 0 | 0 | 1 |
| 14 | B_L1_Bi_NxM | 1 | 1 | 1 | 0 | 0 | 1 | 0 |
| 15 | B_L1_Bi_MxN | 1 | 1 | 1 | 0 | 0 | 1 | 1 |
| 16 | B_Bi_L0_NxM | 1 | 1 | 1 | 0 | 1 | 0 | 0 |
| 17 | B_Bi_L0_MxN | 1 | 1 | 1 | 0 | 1 | 0 | 1 |
| 18 | B_Bi_L1_NxM | 1 | 1 | 1 | 0 | 1 | 1 | 0 |
| 19 | B_Bi_L1_MxN | 1 | 1 | 1 | 0 | 1 | 1 | 1 |
| 20 | B_Bi_Bi_NxM | 1 | 1 | 1 | 1 | 0 | 0 | 0 |
| 21 | B_Bi_Bi_MxN | 1 | 1 | 1 | 1 | 0 | 0 | 1 |
| 22 | B_Sub | 1 | 1 | 1 | 1 | 1 | 1 | |

FIG. 24A

| mb_type | mb_type (name) | bin | | | | | | | |
|---|---|---|---|---|---|---|---|---|---|
| 0 | B_Direct_NxN | 0 | | | | | | | |
| 1 | B_L0_NxN | 1 | 0 | 0 | | | | | |
| 2 | B_L1_NxN | 1 | 0 | 1 | | | | | |
| 3 | B_Bi_NxN | 1 | 1 | 0 | | | | | |
| 4 | B_Sub | 1 | 1 | 1 | | | | | |

F I G. 24B

| mb_type | mb_type (name) | bin | | | | |
|---|---|---|---|---|---|---|
| 0 | P_L0_NxN | 0 | 0 | 0 | | |
| 1 | P_L0_L0_NxM | 0 | 1 | 1 | | |
| 2 | P_L0_L0_MxN | 0 | 1 | 0 | | |
| 3 | P_Sub | 0 | 0 | 1 | | |

F I G. 24C

| mb_type | mb_type (name) | bin | | | | |
|---|---|---|---|---|---|---|
| 0 | P_L0_NxN | 0 | | | | |
| 1 | P_Sub | 1 | | | | |

F I G. 24D

| mb_type | mb_type (name) | bin | | | | | | | | |
|---|---|---|---|---|---|---|---|---|---|---|
| 0 | B_Direct_NxN | 0 | | | | | | | | |
| 1 | B_STDS_0 | 1 | 0 | 0 | | | | | | |
| 2 | B_STDS_1 | 1 | 1 | 0 | | | | | | |
| 3 | B_STDS_2 | 1 | 0 | 1 | | | | | | |
| 4 | B_L0_NxN | 1 | 1 | 1 | 0 | 0 | | | | |
| 5 | B_L1_NxN | 1 | 1 | 1 | 0 | 1 | | | | |
| 6 | B_Bi_NxN | 1 | 1 | 1 | 1 | 0 | | | | |
| 7 | B_Sub | 1 | 1 | 1 | 1 | 1 | | | | |

F I G. 25A

| mb_type | mb_type (name) | bin | | | | |
|---|---|---|---|---|---|---|
| 0 | P_STDS_0 | 0 | 0 | | | |
| 1 | P_STDS_1 | 1 | 0 | | | |
| 2 | P_STDS_2 | 0 | 1 | | | |
| 3 | P_L0_NxN | 1 | 1 | 0 | | |
| 6 | P_Sub | 1 | 1 | 1 | | |

F I G. 25B

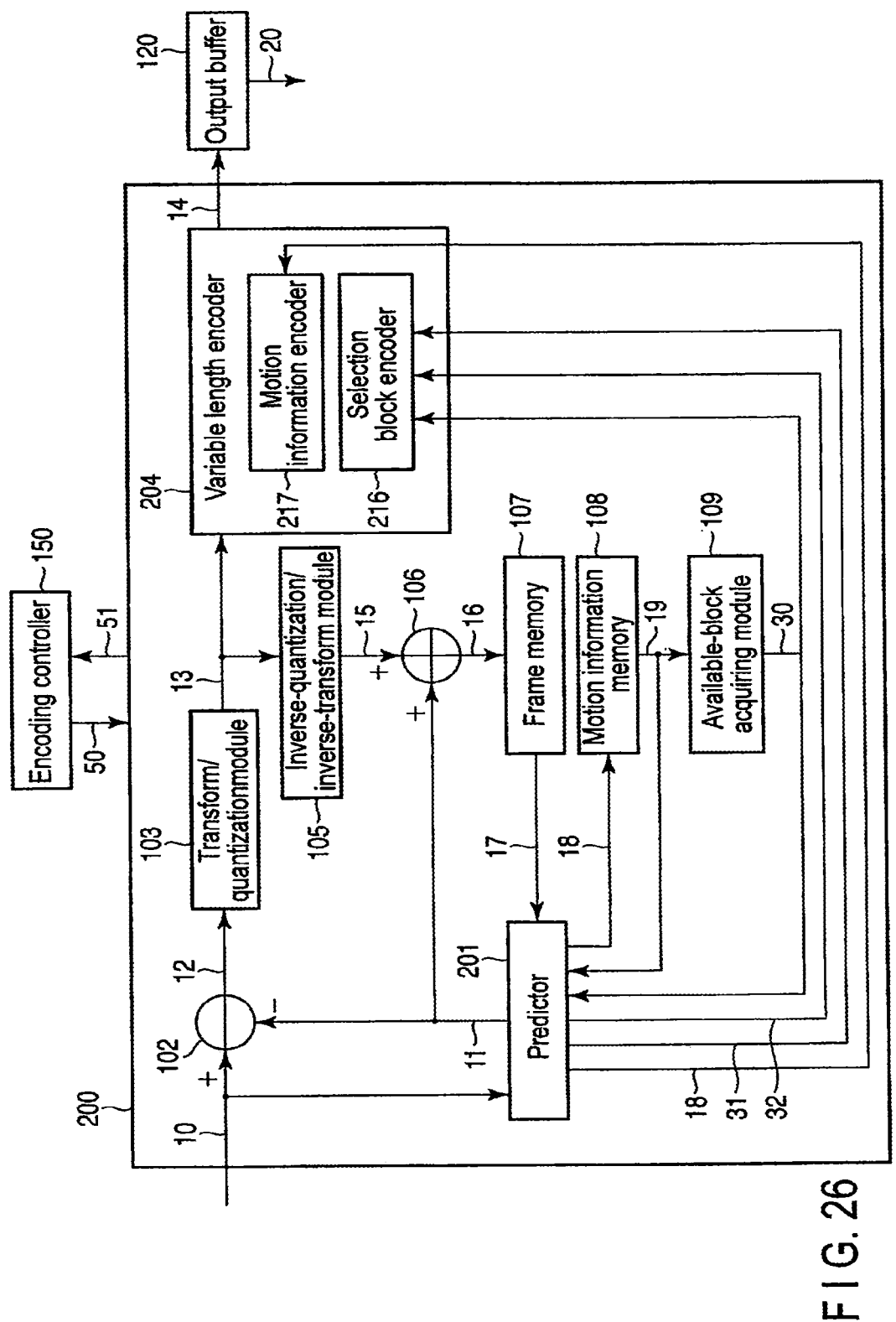
F I G. 26

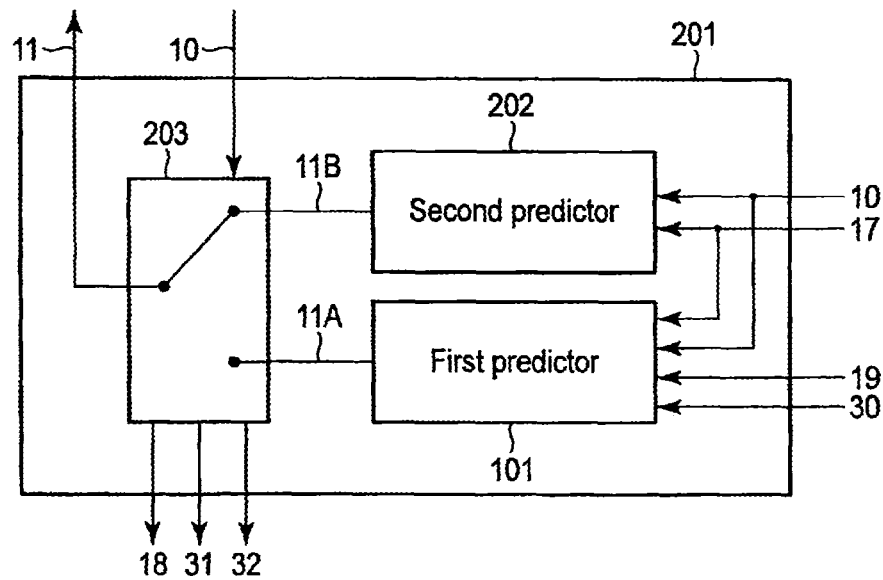
F I G. 27
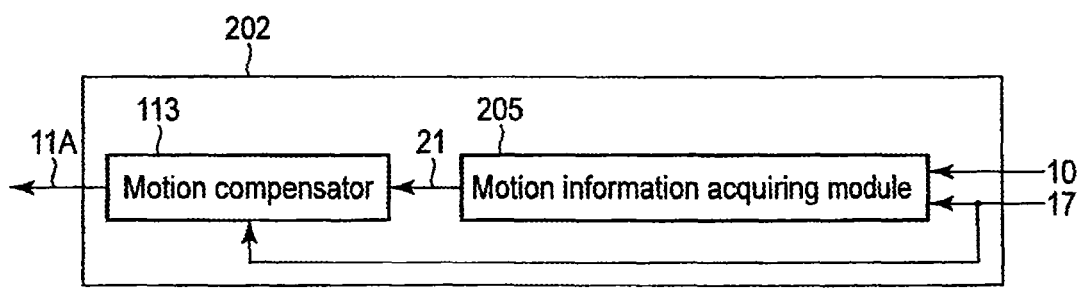
F I G. 28

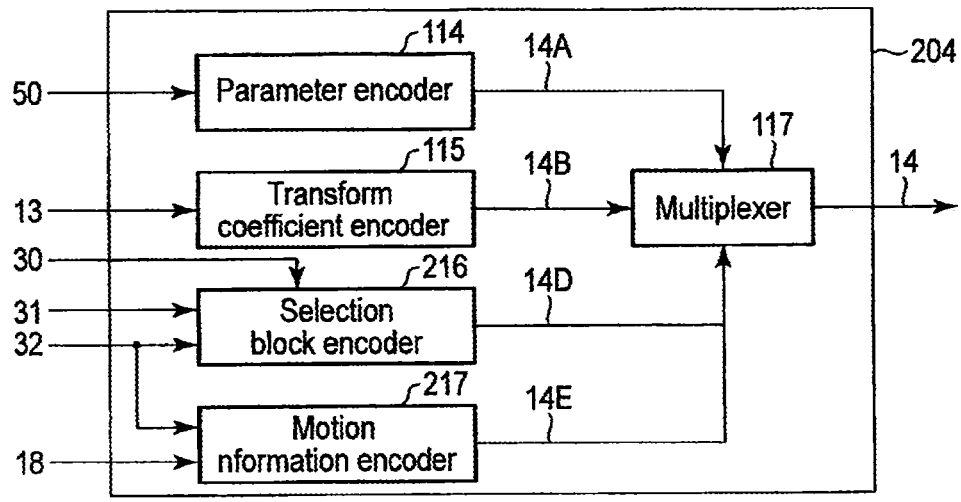
F I G. 29
```
macroblock_layer() {
  ...
  mb_type
  if(mb_type==TARGET_MODE) {
    if(available_block_num>0)
      stds_flag
    if(stds_flag && available_block_num>1)
      stds_idx
  }
  ...
}
```
F I G. 30A
```
macroblock_layer() {
  ...
  mb_skip_flag
  if(available_block_num>0)
    stds_flag
  if(stds_flag && available_block_num>1)
    stds_idx
  if(stds_flag==0)
    mb_type
  ...
}
```
F I G. 30B

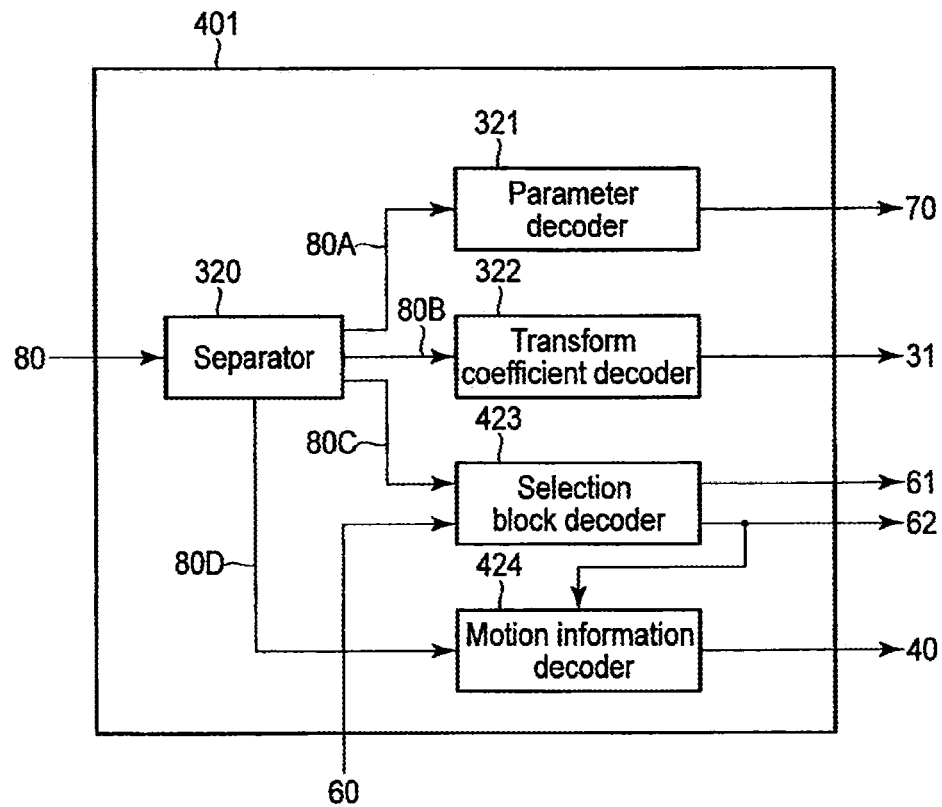
F I G. 35
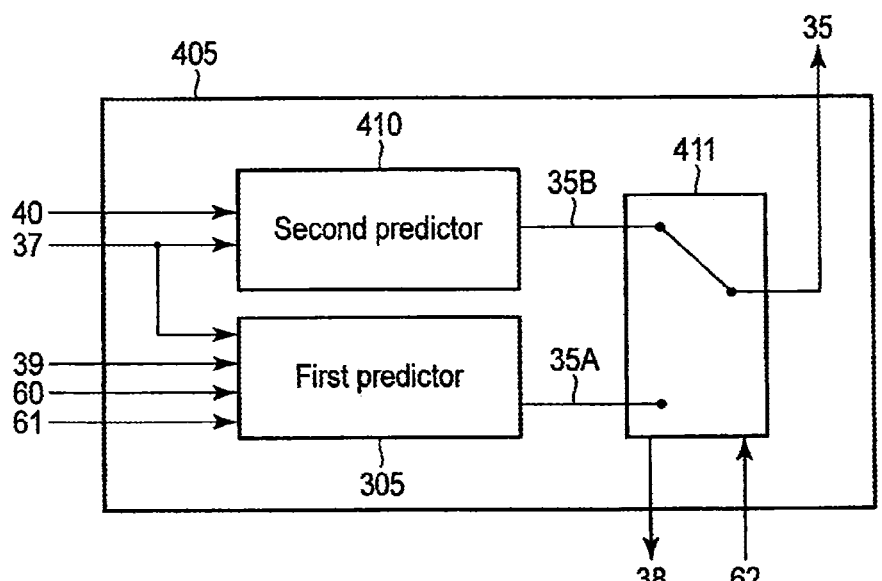
F I G. 36

IMAGE ENCODING METHOD AND IMAGE DECODING METHOD

CROSS REFERENCE TO RELATED APPLICATIONS

This application is a Continuation Application of U.S. application Ser. No. 15/698,336, filed Sep. 7, 2017, which is a Continuation Application of U.S. application Ser. No. 14/190,909, filed Feb. 26, 2014 which is a continuation of U.S. application Ser. No. 13/647,124, filed Oct. 8, 2012, which is a Continuation Application of PCT Application No. PCT/JP2010/056400, filed Apr. 8, 2010, the entire contents of each of which are incorporated herein by reference.

FIELD

Embodiments described herein relate generally to methods for encoding and decoding a moving image and a still image.

BACKGROUND

Recently, a moving image coding method in which a coding efficiency is largely improved is recommended as ITU-T Rec. H.264 and ISO/IEC 14496-10 (hereinafter referred to as H.264) by ITU-T and ISO/IEC. In H.264, prediction processing, transform processing, and entropy coding processing are performed in rectangular block units (for example, a 16-by-16 pixel block unit and an 8-by-8 pixel block unit). In the prediction processing, motion compensation is performed to a rectangular block of an encoding target (hereinafter referred to as an encoding target block). In the motion compensation, a prediction in a temporal direction is performed by referring to an already-encoded frame (hereinafter referred to as a reference frame). In the motion compensation, it is necessary to encode and transmit motion information including a motion vector to a decoding side. The motion vector is information on a spatial shift between the encoding target block and a block referred to in the reference frame. In the case that the motion compensation is performed using a plurality of reference frames, it is necessary to encode a reference frame number in addition to the motion information. Therefore, a code amount related to the motion information and the reference frame number may increase.

A direct mode, in which the motion vector to be allocated to the encoding target block is derived from the motion vectors allocated to the already-encoded blocks and the predicted image is generated based on the derived motion vector, is cited as an example of a method for evaluating the motion vector in motion compensation prediction (see JP-B 4020789 and U.S. Pat. No. 7,233,621). In the direct mode, because the motion vector is not encoded, the code amount of the motion information can be reduced. For example, the direct mode is adopted in H.264/AVC.

In the direct mode, the motion vector of the encoding target block is predicted and generated by a fixed method for calculating the motion vector from a median of the motion vectors of the already-encoded blocks adjacent to the encoding target block. Therefore, the motion vector calculation has a low degree of freedom.

A method for selecting one already-encoded block from the already-encoded blocks to allocate the motion vector to the encoding target block has been proposed in order to enhance the degree of freedom of the motion vector calculation. In the method, it is necessary to always transmit selection information identifying the selected block to the decoding side such that the decoding side can identify the selected already-encoded block. Accordingly, the code amount related to the selection information increases in the case that the motion vector to be allocated to the encoding target block is decided by selecting one already-encoded block from the already-encoded blocks.

BRIEF DESCRIPTION OF THE DRAWINGS

FIG. 8A is a view illustrating an example of dispositions of spatial-direction and temporal-direction motion reference blocks.

FIG. 8B is a view illustrating another example of the disposition of the spatial-direction motion reference block.

FIG. 8C is a view illustrating a relative position of the spatial-direction motion reference block with respect to an encoding target block in FIG. 8B.

FIG. 8D is a view illustrating another example of the disposition of the temporal-direction motion reference block.

FIG. 8E is a view illustrating still another example of the disposition of the temporal-direction motion reference block.

FIG. 10 is a view illustrating an example of the available block that is selected from the motion reference blocks in FIG. 8 by the method in FIG. 9.

FIG. 11 is a view illustrating an example of an available block information output by the available-block acquiring module in FIG. 1.

FIG. 12A is a view illustrating an example of an identity determination between pieces of motion information on blocks, which is performed by the available-block acquiring module in FIG. 1.

FIG. 12B is a view illustrating another example of the identity determination between the pieces of motion information on the blocks, which is performed by the available-block acquiring module in FIG. 1.

FIG. 12C is a view illustrating still another example of the identity determination between the pieces of motion information on the blocks, which is performed by the available-block acquiring module in FIG. 1.

FIG. 18 is a block diagram schematically illustrating a configuration of a variable length encoder in FIG. 1.

FIG. 19 is a view illustrating an example in which a syntax is generated according to the available block information.

FIG. 20 is a view illustrating an example of binarization of a selection block information syntax corresponding to the available block information.

FIG. 21 is an explanatory view illustrating scaling of the motion information.

FIG. 24A is a view illustrating a mb_type in B-slice of H.264 and a code table corresponding to the mb_type.

FIG. 24B is a view illustrating an example of the code table of the first embodiment.

FIG. 24C is a view illustrating the mb_type in P-slice of H.264 and a code table corresponding to the mb_type.

FIG. 24D is a view illustrating an example of the code table of the first embodiment.

FIG. 25A is a view illustrating the mb_type in the B-slice and an example of the code table corresponding to the mb_type.

FIG. 25B is a view illustrating the mb_type in the P-slice and another example of the code table corresponding to the mb_type.

FIG. 26 is a block diagram schematically illustrating a configuration of an image encoding apparatus according to a second embodiment.

FIG. 27 is a block diagram schematically illustrating a configuration of a predictor in FIG. 26.

FIG. 28 is a block diagram schematically illustrating a configuration of a second predictor in FIG. 27.

FIG. 29 is a block diagram schematically illustrating a configuration of a variable length encoder in FIG. 26.

FIG. 30A is a view illustrating an example of a macroblock layer syntax of the second embodiment.

FIG. 30B is a view illustrating another example of the macroblock layer syntax of the second embodiment.

FIG. 35 is a block diagram illustrating detail of an encoded sequence decoder in FIG. 33.

FIG. 36 is a block diagram illustrating detail of a predictor in FIG. 33.

DETAILED DESCRIPTION

In general, according to one embodiment, an image encoding method includes selecting a motion reference block from an already-encoded pixel block including motion information. The method includes selecting an available block from the motion reference block, the available block including a candidate of motion information applied to an encoding target block, the available block including different motion information. The method includes selecting a selection block from the available block. The method includes generating a predicted image of the encoding target block using motion information of the selection block. The method includes encoding a prediction error between the predicted image and an original image. The method includes encoding selection information identifying the selection block by referring to a code table decided according to a number of the available block.

Embodiments provide image encoding and image decoding methods having a high encoding efficiency.

Hereinafter, image encoding and image decoding methods and apparatuses according to embodiments will be described with reference to the drawings. In the embodiments, like reference numbers denote like elements, and duplicated explanations will be avoided.

First Embodiment

Figure 1:
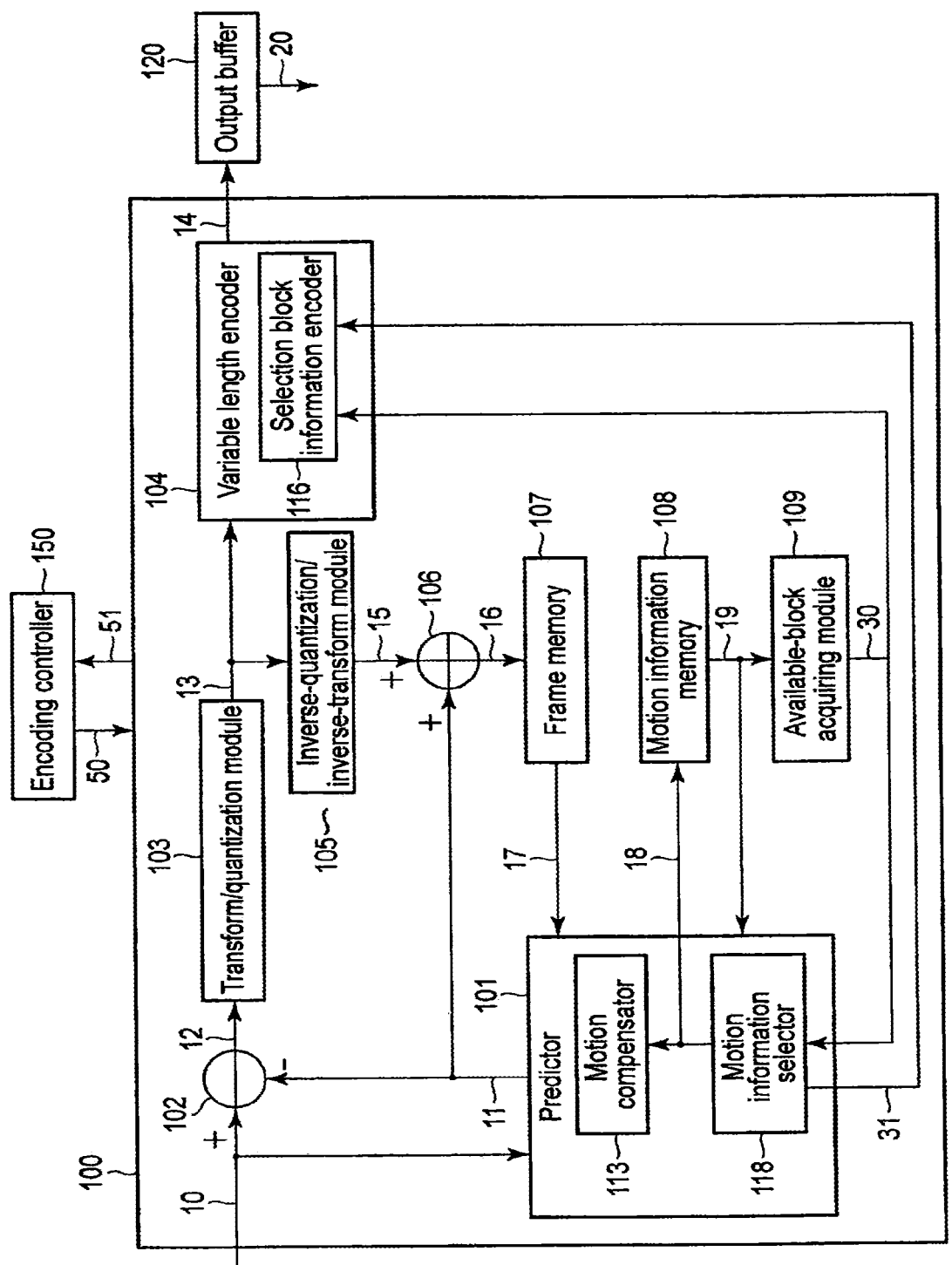
FIG. 1 is a block diagram schematically illustrating a configuration of an image encoding apparatus according to a first embodiment.

FIG. 1 is a block diagram schematically illustrating a configuration of an image encoding apparatus according to a first embodiment. As illustrated in FIG. 1, the image encoding apparatus includes an image encoder 100, an encoding controller 150, and an output buffer 120. The image encoding apparatus may be realized by hardware, such as an LSI chip, or realized by causing a computer to execute an image encoding program.

For example, an original image (input image signal) 10 that is of a moving image or a still image is input to the image encoder 100 in units of the pixel blocks into which the original image is divided. The image encoder 100 performs compression encoding of the input image signal 10 to generate encoded data 14. The generated encoded data 14 is temporarily stored in the output buffer 120, and transmitted to a storage system (a storage media, not illustrated) or a transmission system (a communication line, not illustrated) at an output timing managed by the encoding controller 150.

The encoding controller 150 controls the entire encoding processing of the image encoder 100, namely, feedback control of a generated code amount, quantization control, prediction mode control, and entropy encoding control. Specifically, the encoding controller 150 provides encoding control information 50 to the image encoder 100, and properly receives feedback information 51 from the image encoder 100. The encoding control information 50 includes prediction information, motion information 18, and quantization parameter information. The prediction information includes prediction mode information and block size information. The motion information 18 includes a motion vector, a reference frame number, and a prediction direction (a unidirectional prediction and a bidirectional prediction). The quantization parameter information includes a quantization parameter, such as a quantization width (or a quantization step size), and a quantization matrix. The feedback information 51 includes the generated code amount by the image encoder 100. For example, the feedback information 51 is used to decide the quantization parameter.

The image encoder 100 encodes the input image signal 10 in units of pixel blocks (for example, a macroblock, a sub-block, and one pixel) into which the original image is divided. Therefore, the input image signal 10 is sequentially input to the image encoder 100 in units of pixel blocks into which the original image is divided. In the present embodiment, the processing unit for encoding is set to the macroblock, the pixel block (macroblock) that is of an encoding target corresponding to the input image signal 10 is simply referred to as an encoding target block. An image frame including the encoding target block, namely, the image frame of the encoding target is referred to as an encoding target frame.

Figure 2A:
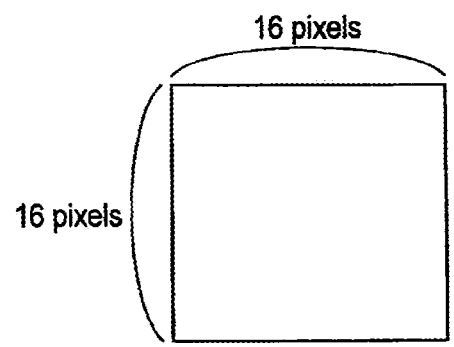
FIG. 2A is a view illustrating an example of a size of a macroblock that is of an encoding processing unit of an image decoder in FIG. 1.
Figure 2B:
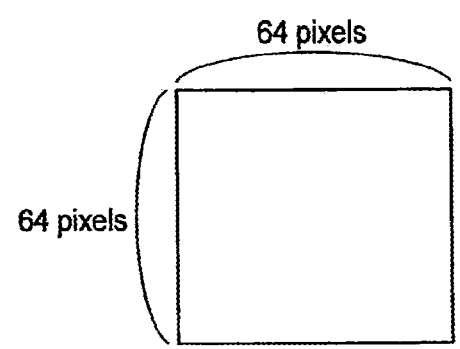
FIG. 2B is a view illustrating another example of the size of the macroblock that is of the encoding processing unit of the image decoder in FIG. 1.

For example, the encoding target block may be a 16-by-16-pixel block as shown in FIG. 2A, or a 64-by-64-pixel block as shown in FIG. 2B. The encoding target block may be a 32-by-32-pixel block or an 8-by-8-pixel block. A shape of the macroblock is not limited to squares in FIGS. 2A and 2B, and the macroblock may be set to any shape, such as a rectangle. The processing unit is not limited to the pixel block, such as the macroblock, and the frame or the field may be used as the processing unit.

Figure 3:
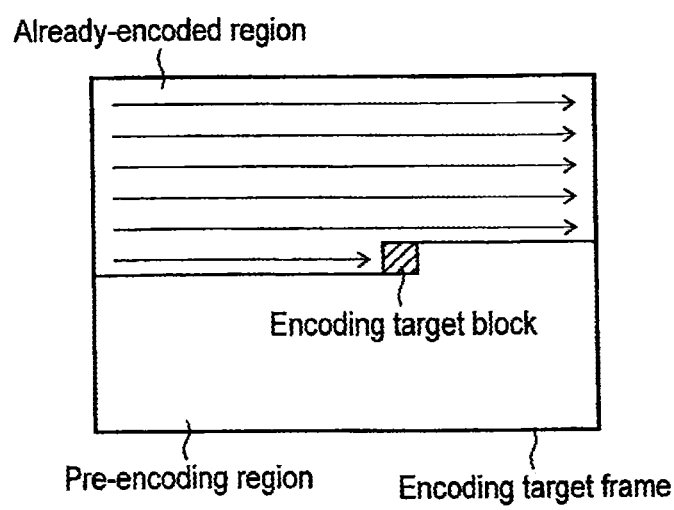
FIG. 3 is a view illustrating a procedure in which the image encoder in FIG. 1 encodes a pixel block in an encoding target frame.

The encoding processing may be performed to each pixel block in the encoding target frame in any order. In the present embodiment, for the sake of convenience, it is assumed that, as illustrated in FIG. 3, the encoding processing is performed from the upper-left pixel block of the encoding target frame toward the lower-right pixel block, namely, in a raster-scan order.

The image encoder 100 in FIG. 1 includes a predictor 101, a subtractor 102, a transform/quantization module 103, a variable length encoder 104, an inverse-quantization/inverse-transform module 105, an adder 106, a frame memory 107, a motion information memory 108, and an available-block acquiring module 109.

In the image encoder 100, the input image signal 10 is provided to the predictor 101 and the subtractor 102. The subtractor 102 receives the input image signal 10, and receives a predicted image signal 11 from the predictor 101. The subtractor 102 calculates a difference between the input image signal 10 and the predicted image signal 11 to generate a prediction error image signal 12.

The transform/quantization module 103 receives the prediction error image signal 12 from the subtractor 102, and performs transform processing to the received prediction error image signal 12 to generate a transform coefficient. For example, the transform processing is an orthogonal transform such as a discrete cosine transform (DCT). In another embodiment, the transform/quantization module 103 may generate the transform coefficient using techniques such as a wavelet transform and an independent component analysis, instead of the discrete cosine transform. Then the transform/quantization module 103 quantizes the generated transform coefficient based on the quantization parameter provided by the encoding controller 150. A quantized transform coefficient (also called transform coefficient information) 13 is output to the variable length encoder 104 and the inverse-quantization/inverse-transform module 105.

The inverse-quantization/inverse-transform module 105 inversely quantizes the quantized transform coefficient 13 according to the quantization parameter provided by the encoding controller 150, namely, the quantization parameter identical to that of the transform/quantization module 103. Then the inverse-quantization/inverse-transform module 105 performs an inverse transform to the inversely-quantized transform coefficient to generate a decoded prediction error signal 15. The inverse transform processing performed by the inverse-quantization/inverse-transform module 105 is coincided with the inverse transform processing of the transform processing performed by the transform/quantization module 103. For example, the inverse transform processing is an inverse discrete cosine transform (IDCT) or an inverse wavelet transform.

The adder 106 receives the decoded prediction error signal 15 from the inverse-quantization/inverse-transform module 105, and receives the predicted image signal 11 from the predictor 101. The adder 106 adds the decoded prediction error signal 15 and the predicted image signal 11 to generate a locally-decoded image signal 16. The generated locally-decoded image signal 16 is stored as a reference image signal 17 in the frame memory 107. The reference image signal 17 stored in the frame memory 107 is read and referred to by the predictor 101 in encoding the encoding target block.

The predictor 101 receives the reference image signal 17 from the frame memory 107, and receives available block information 30 from the available-block acquiring module 109. The predictor 101 receives reference motion information 19 from the motion information memory 108. The predictor 101 generates the predicted image signal 11, the motion information 18, selection block information 31 of the encoding target block based on the reference image signal 17, the reference motion information 19, and the available block information 30. Specifically, the predictor 101 includes a motion information selector 118 that generates the motion information 18 and the selection block information 31 based on the available block information 30 and the reference motion information 19 and a motion compensator 113 that generates the predicted image signal 11 based on the motion information 18. The predicted image signal 11 is transmitted to the subtractor 102 and the adder 106. The motion information 18 is stored in the motion information memory 108 for the prediction processing performed to the subsequent encoding target block. The selection block information 31 is transmitted to the variable length encoder 104. The predictor 101 is described in detail later.

Figure 4:
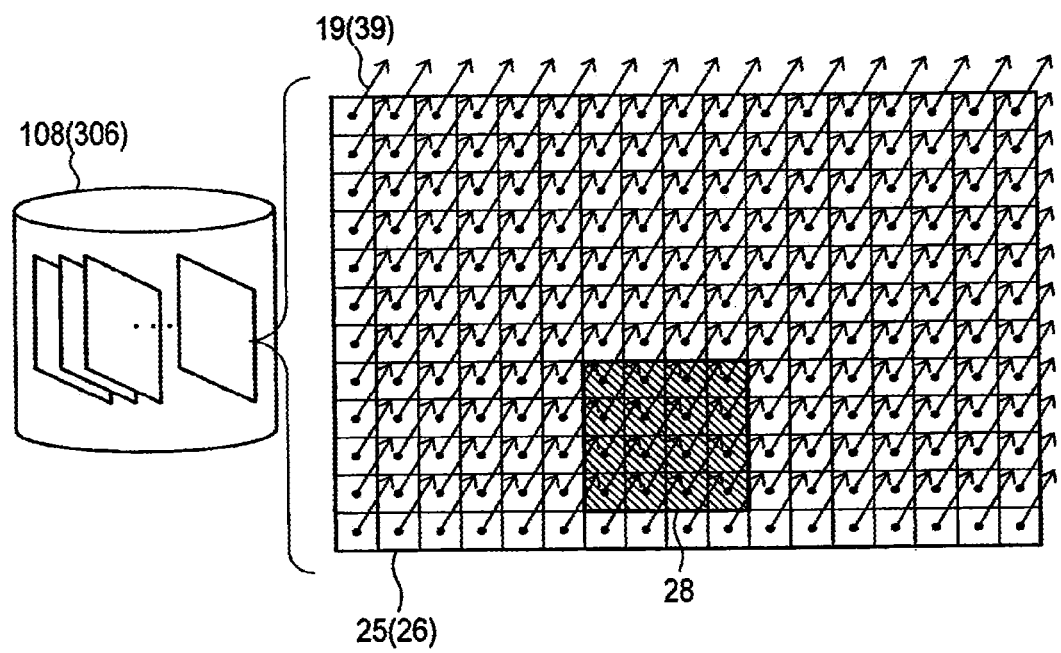
FIG. 4 is a view illustrating an example of a motion information frame retained by a motion information memory in FIG. 1.

The motion information 18 is temporarily stored as the reference motion information 19 in the motion information memory 108. FIG. 4 illustrates an example of a configuration of the motion information memory 108. As illustrated in FIG. 4, the pieces of reference motion information 19 are retained in units of frames in the motion information memory 108, and form a motion information frame 25. The pieces of motion information 18 on the already-encoded blocks are sequentially provided to the motion information memory 108. As a result, the motion information memory 108 retains a plurality of motion information frames 25 having different encoding times.

The pieces of reference motion information 19 are retained in the motion information frame 25 in predetermined units of blocks (for example, units of 4-by-4-pixel blocks). The motion vector block 28 in FIG. 4 indicates a pixel block having the same size as the encoding target block, the available block, and the selection block. For example, the motion vector block 28 is the 16-by-16-pixel block. For example, the motion vector is allocated in each 4-by-4-pixel block to the motion vector block 28. The inter prediction processing in which the motion vector block is used is referred to as motion vector block prediction processing. The reference motion information 19 retained by the motion information memory 108 is read by the predictor 101 in generating the motion information 18. The motion information 18 possessed by the available block means the reference motion information 19 that is retained in a region where the available block is located, in the motion information memory 108.

The motion information memory 108 is not limited to the example in which the pieces of reference motion information 19 are retained in units of 4-by-4-pixel blocks, and the pieces of reference motion information 19 may be retained in another pixel block unit. For example, the pixel block unit related to the reference motion information 19 may be one pixel or a 2-by-2-pixel block. The shape of the pixel block related to the reference motion information 19 is not limited to a square, and the pixel block may have any shape.

The available-block acquiring module 109 in FIG. 1 acquires the reference motion information 19 from the motion information memory 108, and selects the available block that can be used in the prediction processing of the predictor 101, from the plurality of already-encoded blocks based on the acquired reference motion information 19. The selected available block is transmitted as the available block information 30 to the predictor 101 and the variable length encoder 104. The already-encoded block that becomes a candidate to select the available block is referred to as a motion reference block. A method for selecting the motion reference block and the available block is described in detail later.

In addition to the transform coefficient information 13, the variable length encoder 104 receives the selection block information 31 from the predictor 101, receives the prediction information and encoding parameters, such as the quantization parameter, from the encoding controller 150, and receives the available block information 30 from the available-block acquiring module 109. The variable length encoder 104 performs entropy encoding (for example, fixed-length coding, Huffman coding, and arithmetic coding) to the quantized transform coefficient information 13, the selection block information 31, the available block information 30, and the encoding parameter to generate the encoded data 14. The encoding parameter includes the parameters necessary to decode the information on the transform coefficient, the information on the quantization, and the like in addition to the selection block information 31 and the prediction information. The generated encoded data 14 is temporarily stored in the output buffer 120, and then transmitted to the storage system (not illustrated) or the transmission system (not illustrated).

Figure 5:
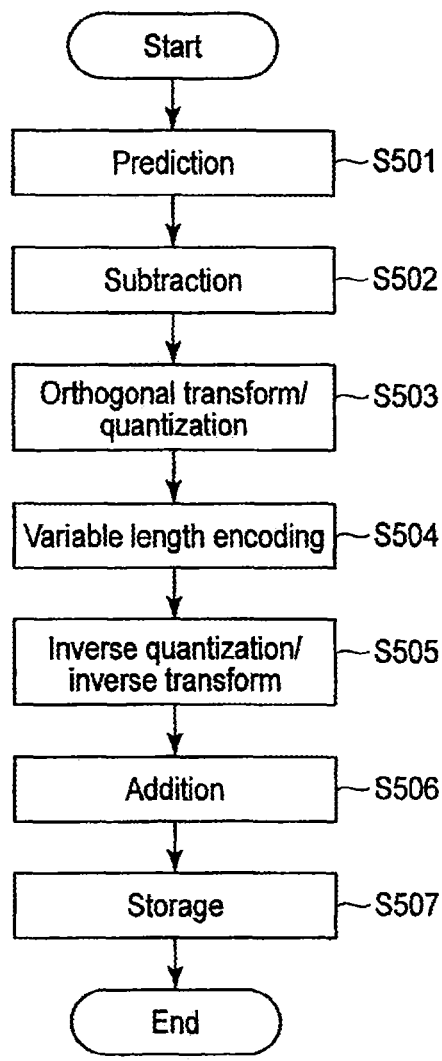
FIG. 5 is a flowchart illustrating an example of a procedure to process an input image signal in FIG. 1.

FIG. 5 illustrates a procedure for processing the input image signal 10. As illustrated in FIG. 5, the predictor 101 generates the predicted image signal 11 (Step S501). In the generation of the predicted image signal 11 in Step S501, one of the available blocks is selected as a selection block, and the predicted image signal 11 is produced using the selection block information 31, the motion information possessed by the selection block, and the reference image signal 17. The subtractor 102 calculates a difference between the predicted image signal 11 and the input image signal 10 to generate a prediction error image signal 12 (Step S502).

The transform/quantization module 103 performs the orthogonal transform and the quantization to the prediction error image signal 12 to generate transform coefficient information 13 (Step S503). The transform coefficient information 13 and the selection block information 31 are transmitted to the variable length encoder 104, and the variable length encoding is performed to the transform coefficient information 13 and the selection block information 31 to generate the encoded data 14 (Step S504). In Step S504, a code table is switched according to the selection block information 31 so as to have as many entries as available blocks, and the variable length encoding is also performed to the selection block information 31. A bit stream 20 of the encoded data is transmitted to the storage system (not illustrated) or the transmission line (not illustrated).

The inverse-quantization/inverse-transform module 105 inversely quantizes the transform coefficient information 13 generated in Step S503, and the inverse transform processing is performed to the inversely-quantized transform coefficient information 13 to generate a decoded prediction error signal 15 (Step S505). The decoded prediction error signal 15 is added to the reference image signal 17 used in Step S501 to create a locally-decoded image signal 16 (Step S506), and the locally-decoded image signal 16 is stored as the reference image signal in the frame memory 107 (Step S507).

Each element of the image encoder 100 according to the present embodiment will be described in detail below.

A plurality of prediction modes are prepared in the image encoder 100 in FIG. 1, and the prediction modes differ from each other in a method for generating the predicted image signal 11 and a motion compensation block size. Specifically, the method by which the predictor 101 generates the predicted image signal 11 is divided into an intra prediction (also called in-frame prediction) that generates a prediction image using the reference image signal 17 of the encoding target frame (or a field) and an inter prediction (also called inter-frame prediction) that generates a prediction image using the reference image signal 17 of at least one already-encoded reference frame (or a reference field). The predictor 101 selectively switches between the intra prediction and the inter prediction to generate the predicted image signal 11 of the encoding target block.

Figure 6A:
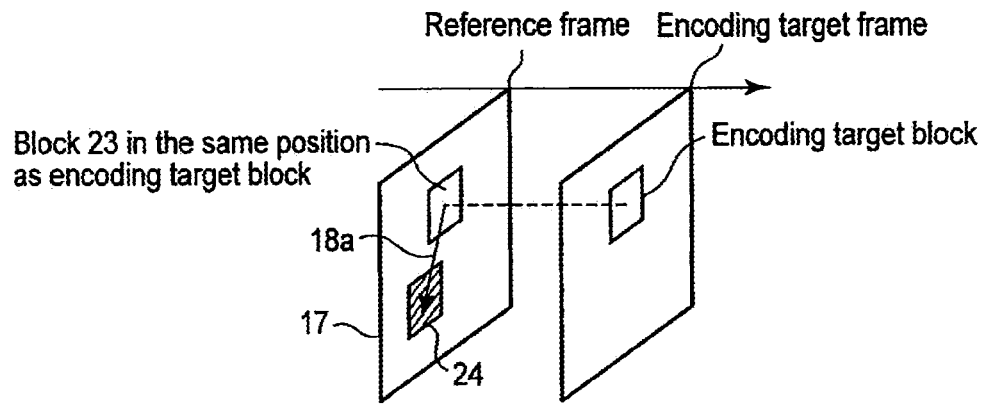
FIG. 6A is a view illustrating an example of inter prediction processing performed by a motion compensator in FIG. 1.

FIG. 6A illustrates an example of the inter prediction performed by the motion compensator 113. As illustrated in FIG. 6A, in the inter prediction, the predicted image signal 11 is generated using the reference image signal 17 of a block 24 at a position that is spatially shifted according to a motion vector 18a included in the motion information 18 from a block (also referred to as a prediction block) 23 which is of a block in the already-encoded reference frame in one frame earlier and is located at the same position as the encoding target block. That is, the reference image signal 17 of the block 24 in the reference frame, which is identified by the position (the coordinate) of the encoding target block and the motion vector 18a included in the motion information 18, is used to generate the predicted image signal 11. In the inter prediction, motion compensation of decimal pixel accuracy (for example, ½ pixel accuracy or ¼ pixel accuracy) can be performed, and a value of an interpolation pixel is generated by performing filtering processing to the reference image signal 17. For example, in H.264, interpolation processing can be performed to a luminance signal up to the ¼ pixel accuracy. In the case of the motion compensation of the ¼ pixel accuracy, an information amount of the motion information 18 is quadruple of that of the integer pixel accuracy.

Figure 6B:
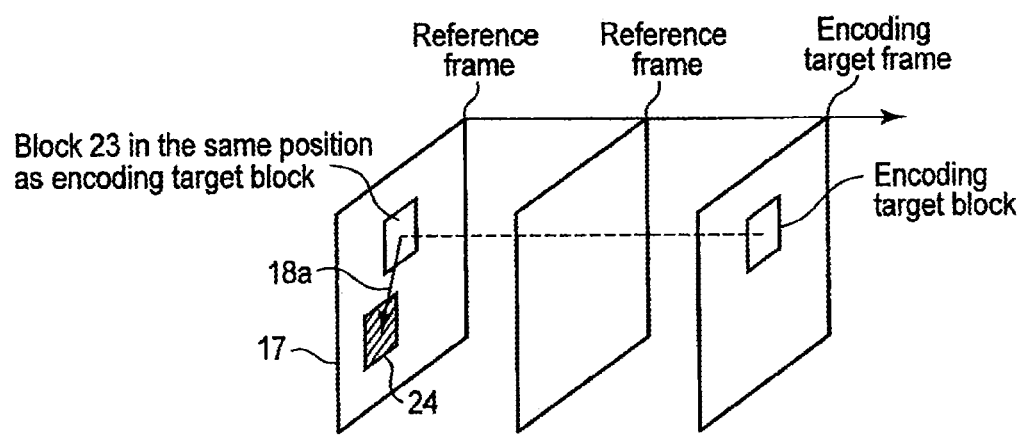
FIG. 6B is a view illustrating another example of the inter prediction processing performed by the motion compensator in FIG. 1.

The inter prediction is not limited to the example in which the reference frame in one frame earlier is used as illustrated in FIG. 6A, and any already-encoded reference frame may be used as illustrated in FIG. 6B. In the case that the reference image signals 17 of the multiple reference frames having different temporal positions are retained, the information indicating where the predicted image signal 11 is generated from the reference image signal 17 is expressed by the reference frame number. The reference frame number is included in the motion information 18. The reference frame number can be changed in region units (such as picture units and block units). That is, a different reference frame can be used in each pixel block. For example, in the case that the reference frame in the preceding already-encoded frame is used in the prediction, the reference frame number in this region is set to 0. In the case that the reference frame in the second preceding already-encoded frame is used in the prediction, the reference frame number in this region is set to 1. For example, in the case that the reference image signal 17 only for one frame is retained in the frame memory 107 (only one reference frame is retained), the reference frame number is always set to 0.

Figure 7A:
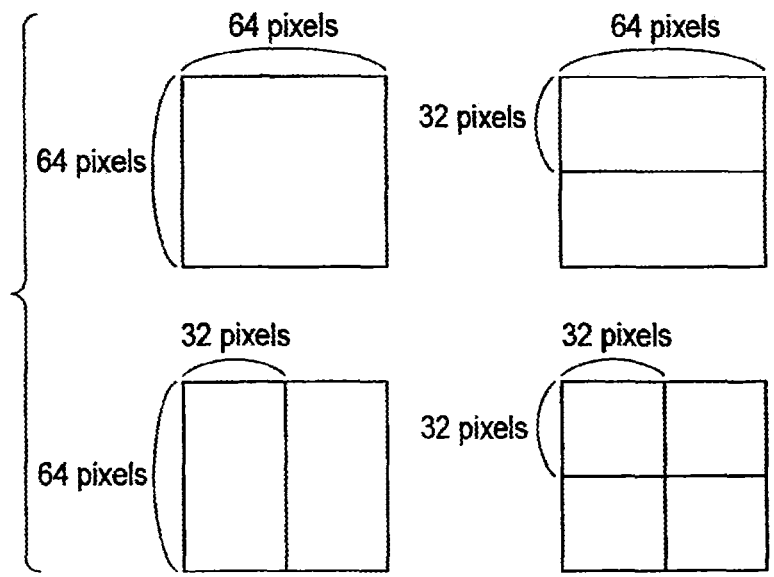
FIG. 7A is a view illustrating an example of a size of a motion compensation block used in the inter prediction processing.
Figure 7B:
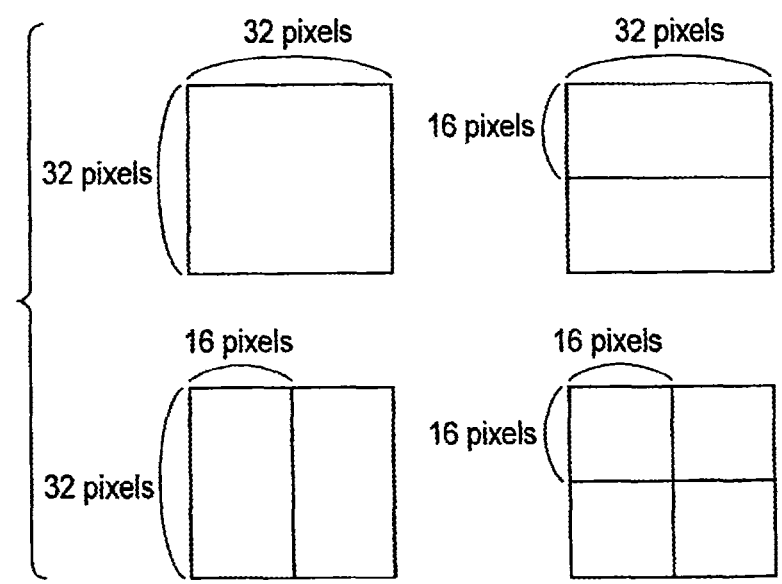
FIG. 7B is a view illustrating another example of the size of the motion compensation block used in the inter prediction processing.
Figure 7C:
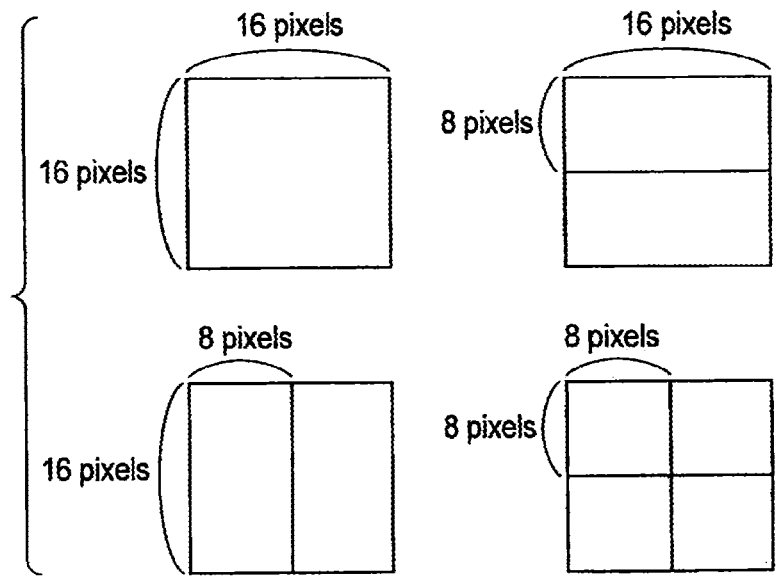
FIG. 7C is a view illustrating still another example of the size of the motion compensation block used in the inter prediction processing.
Figure 7D:
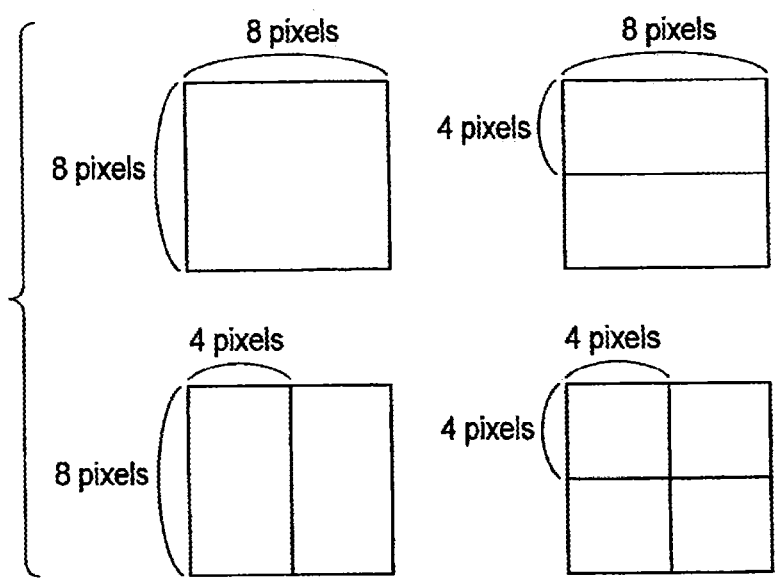
FIG. 7D is a view illustrating still another example of the size of the motion compensation block used in the inter prediction processing.

In the inter prediction, the block size suitable for the encoding target block can be selected from a plurality of motion compensation blocks. That is, the encoding target block is divided into small pixel blocks, and the motion compensation may be performed in each small pixel block. FIGS. 7A to 7C illustrate the size of the motion compensation block in units of macroblocks, and FIG. 7D illustrates the size of the motion compensation block in units of sub-blocks (the pixel block that is less than or equal to the 8-by-8-pixel block). As illustrated in FIG. 7A, in the case that the encoding target block has the 64×64 pixels, the 64-by-64-pixel block, the 64-by-32-pixel block, the 32-by-64-pixel block, or the 32-by-32-pixel block can be selected as the motion compensation block. As illustrated in FIG. 7B, in the case that the encoding target block has 32×32 pixels, the 32-by-32-pixel block, the 32-by-16-pixel block, the 16-by-32-pixel block, or the 16-by-16-pixel block can be selected as the motion compensation block. As illustrated in FIG. 7C, in the case that the encoding target block has 16×16 pixels, the motion compensation block can be set to the 16-by-16-pixel block, the 16-by-8-pixel block, the 8-by-16-pixel block, or the 8-by-8-pixel block. As illustrated in FIG. 7D, in the case that the encoding target block has the 8×8 pixels, the 8-by-8-pixel block, the 8-by-4-pixel block, the 4-by-8-pixel block, or the 4-by-4-pixel block can be selected as the motion compensation block.

As described above, the small pixel block (for example, the 4-by-4-pixel block) in the reference frame used in the inter prediction has the motion information 18, so that the shape and the motion vector of the optimum motion compensation block can be used according to the local property of the input image signal 10. The macroblocks and the sub-macroblocks in FIGS. 7A to 7D can arbitrarily be combined. In the case that the encoding target block is the 64-by-64-pixel block as illustrated in FIG. 7A, the 64-by-64-pixel block to the 16-by-16-pixel block can hierarchically be used by selecting each block size in FIG. 7B with respect to the four 32-by-32-pixel blocks into which the 64-by-64-pixel block is divided. Similarly, the 64-by-64-pixel block to the 4-by-4-pixel block can hierarchically be used in the case that the block size in FIG. 7D can be selected as the encoding target block.

The motion reference block will be described below with reference to FIGS. 8A to 8F.

The motion reference block is selected from the already-encoded regions (blocks) in the encoding target frame and in the reference frame according to the method decided by both the image encoding apparatus in FIG. 1 and an image decoding apparatus. FIG. 8A illustrates an example of dispositions of the motion reference blocks that are selected according to the position of the encoding target block. In the example in FIG. 8A, nine motion reference blocks A to D and TA to TE are selected from the already-encoded regions in the encoding target frame and the already-encoded regions in the reference frame. Specifically, four blocks A, B, C, and D that are adjacent to a left, a top, an upper right, and an upper left of the encoding target block are selected as the motion reference block from the encoding target frame, and the block TA in the same position as the encoding target block and four pixel blocks TB, TC, TD, and TE that are adjacent to a right, a bottom, the left, and the top of the block TA are selected as the motion reference block from the reference frame. In the present embodiment, the motion reference block selected from the encoding target frame is referred to as a spatial-direction motion reference block, and the motion reference block selected from the reference frame is referred to as a temporal-direction motion reference block. A symbol p added to each motion reference block in FIG. 8A indicates an index of the motion reference block. The index is numbered in the order of the temporal-direction motion reference block and the order of the spatial-direction motion reference block. Alternatively, the index may be numbered in any order unless the indexes are overlapped with each other. For example, the temporal-direction and spatial-direction motion reference blocks may be numbered in a random order.

The spatial-direction motion reference block is not limited to the example in FIG. 8A. For example, as illustrated in FIG. 8B, the spatial-direction motion reference blocks may be blocks (for example, macroblocks or a sub-macroblocks) to which pixels a, b, c, and d adjacent to the encoding target block belong. In this case, a relative position (dx,dy) of each of the pixels a, b, c, and d is set with respect to an upper-left pixel e in the encoding target block as illustrated in FIG. 8C. In the examples in FIGS. 8A and 8B, it is assumed that the macroblock is an N-by-N-pixel block.

As illustrated in FIG. 8D, all blocks A1 to A4, B1, B2, C, and D adjacent to the encoding target block may be selected as the spatial-direction motion reference block. In the example in FIG. 8D, there are eight spatial-direction motion reference blocks.

Figure 8F:
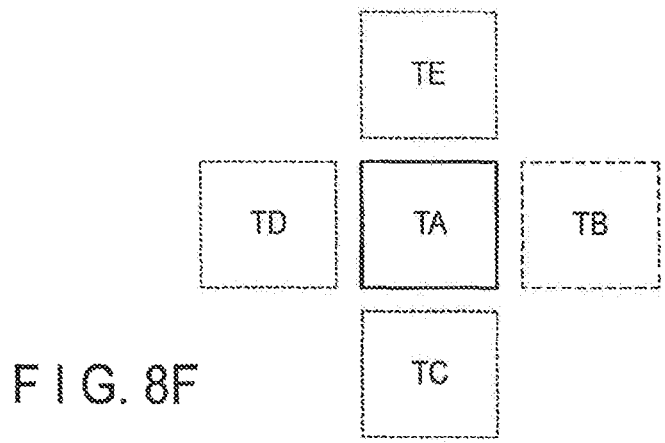
FIG. 8F is a view illustrating still another example of the disposition of the temporal-direction motion reference block.

In the temporal-direction motion reference blocks, some of blocks TA to TE may be overlapped as illustrated in FIG. 8E, or the blocks TA to TE may be separated as illustrated in FIG. 8F. In FIG. 8E, an overlapping portion of the temporal-direction motion reference blocks TA and TB is indicated by oblique lines. The temporal-direction motion reference block is not necessarily located in and around the position (collocate position) corresponding to the encoding target block, and the temporal-direction motion reference block may be disposed at any position in the reference frame. For example, when a block in the reference frame is set to a central block (for example, the block TA), which is identified by the position of the reference block and the motion information 18 possessed by one of the already-encoded blocks adjacent to the encoding target block, the central block and a block around the central block may be selected as the temporal-direction motion reference block. It is not always necessary that the temporal-direction reference blocks be disposed at equal intervals from the central block.

In each of the cases, when the numbers and the positions of the spatial-direction and temporal-direction motion reference blocks are previously decided between the encoding apparatus and decoding apparatus, the numbers and the positions of the motion reference block may be set in any manner. It is not always necessary that the size of the motion reference block be identical to that of the encoding target block. For example, as illustrated in FIG. 8D, the motion reference block may be larger than or smaller than the encoding target block. The motion reference block is not limited to the square shape, and the motion reference block may be formed into any shape, such as a rectangular shape. The motion reference block may be set to any size.

The motion reference block and the available block may be disposed only in one of the temporal direction and the spatial direction. The temporal-direction motion reference block and the available block may be disposed according to the kind of slice, such as P-slice and B-slice, or the spatial-direction motion reference block and the available block may be disposed according to the kind of slice.

Figure 9:
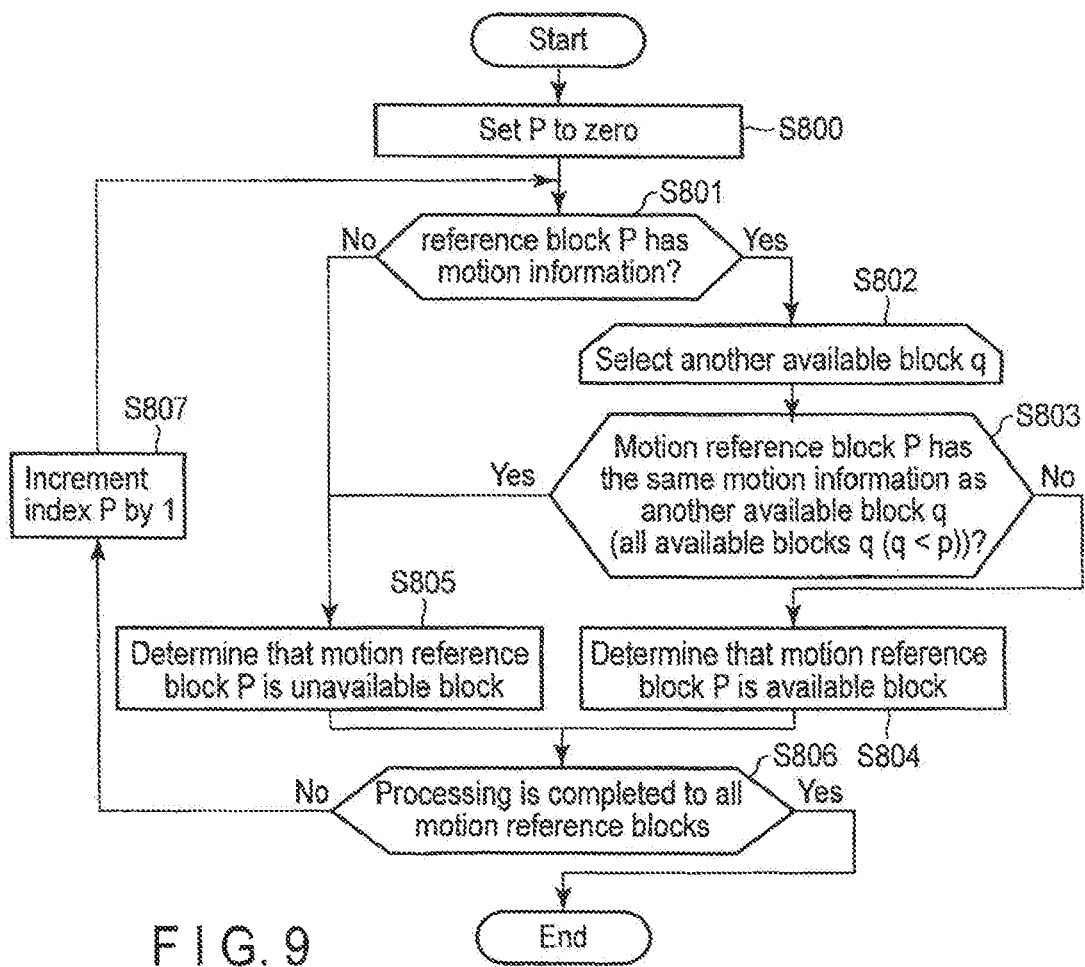
FIG. 9 is a flowchart illustrating an example of a method in which an available-block acquiring module in FIG. 1 selects an available block from motion reference blocks.

FIG. 9 illustrates a method in which the available-block acquiring module 109 selects the available block from the motion reference blocks. The available block is a block in which the motion information can be applied to the encoding target block, and the available blocks have different pieces of motion information. The available-block acquiring module 109 refers to the reference motion information 19, determines whether each motion reference block is the available block according to the method in FIG. 9, and outputs the available block information 30.

As illustrated in FIG. 9, the motion reference block having an index p of zero is selected (S800). In FIG. 9, it is assumed that the motion reference block is sequentially processed from the index p of 0 to an index p of M−1 (where M indicates the number of motion reference blocks). It is assumed that availability determination processing is ended to the motion reference blocks having indexes p of 0 to p−1, and that the motion reference block that is of an availability determination processing target has an index of p.

The available-block acquiring module 109 determines whether the motion reference block p has the motion information 18, namely, whether at least one motion vector is allocated to the motion reference block p (S801). When the motion reference block p does not have the motion vector, namely, when the temporal-direction motion reference block p is a block in an I-slice that does not have the motion information or when the intra prediction encoding is performed to all the small pixel blocks in the temporal-direction motion reference block p, the flow goes to Step S805. In Step S805, the available-block acquiring module 109 determines that the motion reference block p is an unavailable block.

When the motion reference block p has the motion information in Step S801, the flow goes to Step S802. The available-block acquiring module 109 selects a motion reference block q (available block q) that is already selected as the available block, where q is smaller than p. Then the available-block acquiring module 109 compares the motion information 18 on the motion reference block p to the motion information 18 on the available block q to determine whether the motion reference block p and the available block q have identical motion information (S803). When the motion information 18 on the motion reference block p is identical to the motion information 18 on the motion reference block q selected as the available block, the flow goes to Step S805, and the available-block acquiring module 109 determines that the motion reference block p is the unavailable block.

When the motion information 18 on the motion reference block p is not identical to all the pieces of motion information 18 on the available blocks q satisfying q<p in Step S803, the flow goes to Step S804. In Step S804, the available-block acquiring module 109 determines that the motion reference block p is the available block.

When determining that the motion reference block p is the available block or the unavailable block, the available-block acquiring module 109 determines whether the availability determination is made for all the motion reference blocks (S806). When a motion reference block for which the availability determination is not made yet exists, for example, in the case of p<M−1, the flow goes to Step S807. Then the available-block acquiring module 109 increments the index p by 1 (Step S807), and performs Steps S801 to S806 again. When the availability determination is made for all the motion reference blocks in Step S806, the availability determination processing is ended.

Whether each motion reference block is an available block or unavailable block is determined by performing the availability determination processing. The available-block acquiring module 109 generates the available block information 30 including the information on the available block. The amount of information on the available block information 30 is reduced by selecting the available block from the motion reference blocks, and therefore the amount of encoded data 14 can be reduced.

FIG. 10 illustrates an example of a result of the availability determination processing performed on the motion reference blocks in FIG. 8A. In FIG. 10, two spatial-direction motion reference blocks (p=0 and 1) and two temporal-direction motion reference blocks (p=5 and 8) are determined to be the available blocks. FIG. 11 illustrates an example of the available block information 30 related to the example in FIG. 10. As illustrated in FIG. 11, the available block information 30 includes the index, the availability, and a motion reference block name of the motion reference block. In the example in FIG. 11, the indexes p of 0, 1, 5, and 8 are the available blocks, and the number of available blocks is 4. The predictor 101 selects one optimum available block as the selection block from the available blocks, and outputs the information (selection block information) 31 on the selection block. The selection block information 31 includes the number of available blocks and the index value of the selected available block. For example, in the case that the number of available blocks is 4, the variable length encoder 104 encodes the corresponding selection block information 31 using the code table having a maximum entry of 4.

In the case that the intra prediction encoding is performed to at least one of the blocks in the temporal-direction motion reference block p in Step S801 in FIG. 9, the available-block acquiring module 109 may determine that the motion reference block p is the unavailable block. That is, the flow may go to Step S802 only in the case that the inter prediction encoding is performed to all the blocks in the temporal-direction motion reference block p.

FIGS. 12A to 12E illustrate examples in which the determination that the motion information 18 on the motion reference block p is identical to the motion information 18 on the available block q is made in the comparison of the pieces of motion information 18 in Step S803. A plurality of blocks indicated by oblique lines and two white blocks are illustrated in FIGS. 12A to 12E. In FIGS. 12A to 12E, for the sake of convenience, it is assumed that the pieces of motion information 18 on the two white blocks are compared with each other without considering the blocks indicated by oblique lines. It is assumed that one of the two white blocks is the motion reference block p while the other is the motion reference block q (available block q) that is already determined to be available. Either of the two white blocks may be the motion reference block p unless otherwise noted.

FIG. 12A illustrates an example in which both the motion reference block p and the available block q are spatial-direction blocks. In the example in FIG. 12A, the determination that the pieces of motion information 18 are identical to each other is made when these pieces of motion information 18 on blocks A and B are identical to each other. At this point, it is not necessary that the sizes of the blocks A and B be equal to each other.

FIG. 12B illustrates an example in which one of the motion reference block p and the available block q is the spatial-direction block A while the other is the temporal-direction block TB. In FIG. 12B, one block having the motion information exists in the temporal-direction block TB. The determination that the pieces of motion information 18 are identical to each other is made when the motion information 18 on the temporal-direction block TB is identical to the motion information 18 on the spatial-direction block A. At this point, it is not necessary that the sizes of the blocks A and TB be equal to each other.

FIG. 12C illustrates an example in which one of the motion reference block p and the available block q is the spatial-direction block A while the other is the temporal-direction block TB. In FIG. 12C, the temporal-direction block TB is divided into small blocks, and the small blocks have the pieces of motion information 18. In the example in FIG. 12C, the determination that the pieces of motion information 18 are identical to each other is made, when all the blocks having the pieces of motion information 18 have the identical motion information 18, and when the pieces of motion information 18 on the blocks are identical to the motion information 18 on the spatial-direction block A. At this point, it is not necessary that the sizes of the blocks A and TB be equal to each other.

Figure 12D:
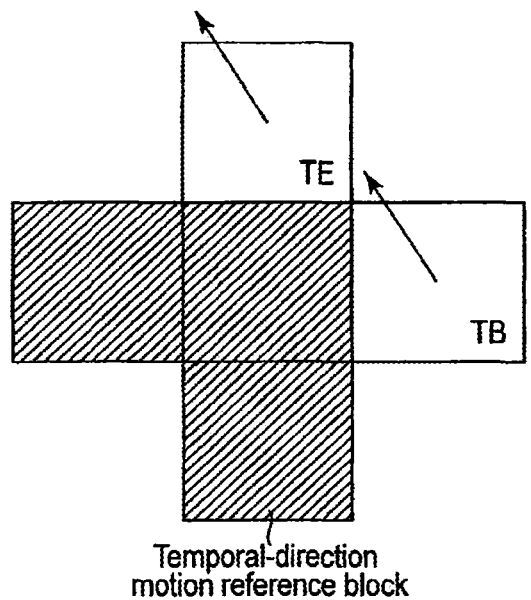
FIG. 12D is a view illustrating still another example of the identity determination between the pieces of motion information on the blocks, which is performed by the available-block acquiring module in FIG. 1.

FIG. 12D illustrates an example in which both the motion reference block p and the available block q are the temporal-direction blocks. In this case, the determination that the pieces of motion information 18 are identical to each other is made when the pieces of motion information 18 on the blocks TB and TE are identical to each other.

Figure 12E:
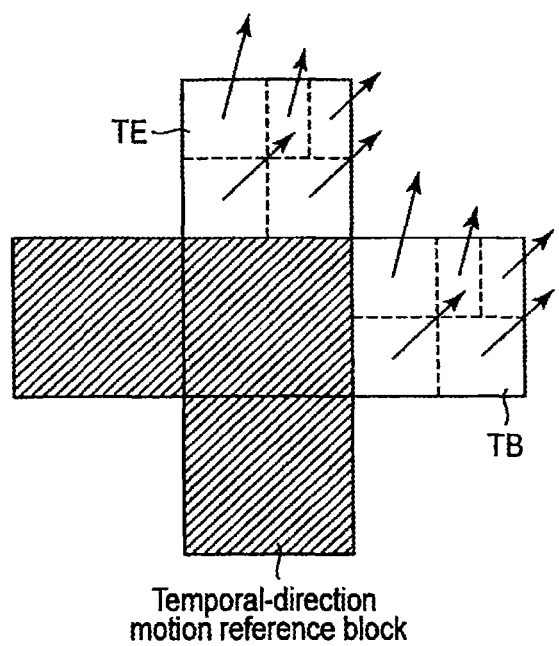
FIG. 12E is a view illustrating still another example of the identity determination between the pieces of motion information on the blocks, which is performed by the available-block acquiring module in FIG. 1.

FIG. 12E illustrates another example in which both the motion reference block p and the available block q are the temporal-direction blocks. In FIG. 12E, the temporal-direction blocks TB and TE are divided into small blocks, and the small blocks having the pieces of motion information 18 exist in each of the temporal-direction blocks TB and TE. In this case, the comparison of the pieces of motion information 18 is performed in each small block in the block, and the determination that the motion information 18 on the block TB is identical to the motion information 18 on the block TE is made when all the small blocks have identical motion information 18.

Figure 12F:
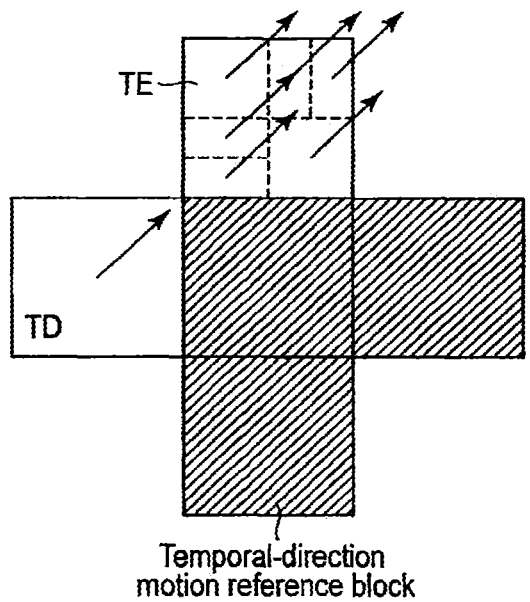
FIG. 12F is a view illustrating still another example of the identity determination between the pieces of motion information on the blocks, which is performed by the available-block acquiring module in FIG. 1.

FIG. 12F illustrates still another example in which both the motion reference block p and the available block q are the temporal-direction blocks. In FIG. 12F, the temporal-direction block TE is divided into small blocks, and the small blocks having the pieces of motion information 18 exist in the block TE. The determination that the pieces of motion information 18 on the blocks TD and TE are identical to each other is made, when all the small blocks having the pieces of motion information 18 have the identical motion information 18 in the block TE, and when the small blocks having the pieces of motion information 18 are identical to the motion information 18 possessed by the block TD.

Thus, whether the motion information 18 on the motion reference block p is identical to the motion information 18 on the available block q is determined in Step S803. In the examples in FIGS. 12A to 12F, one available block q is compared with the motion reference block p. However, in the case that the number of available blocks q is 2 or more, the motion information 18 on the motion reference block p may be compared to the motion information 18 on each available block q. In the case that scaling is applied, the post-scaling motion information 18 becomes the above motion information 18.

The determination that the motion information on the motion reference block p is identical to the motion information on the available block q is not limited to the case that the motion vectors included in the pieces of motion information are identical to each other. For example, when a norm of a difference between the two motion vectors falls within a predetermined range, the motion information on the motion reference block p may be substantially identical to the motion information on the available block q.

Figure 13:
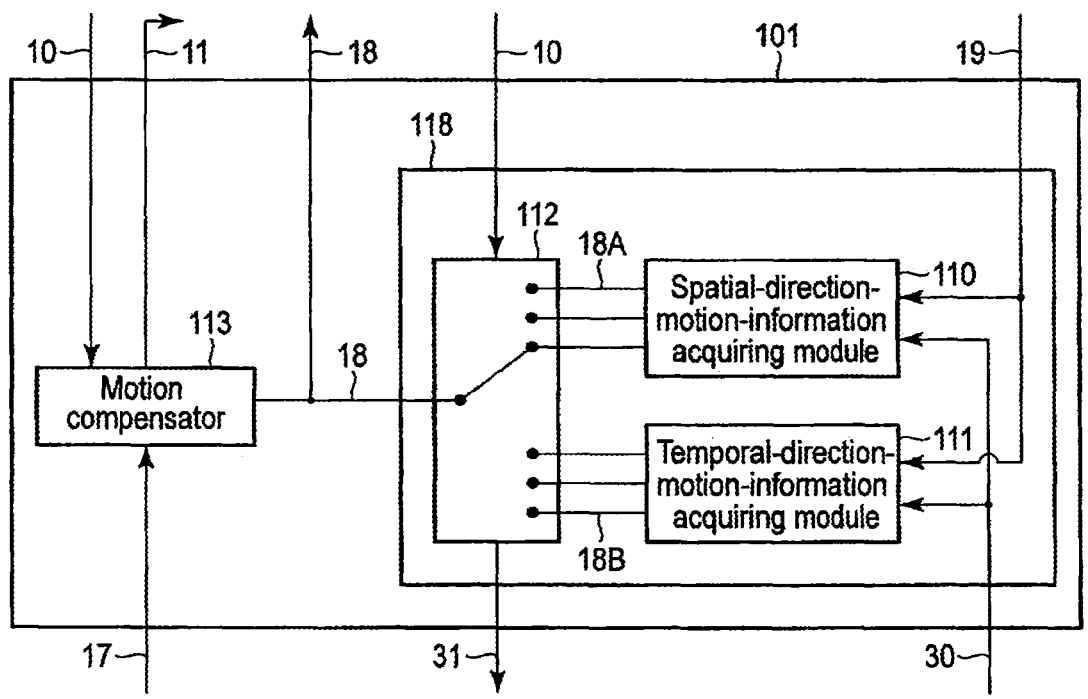
FIG. 13 is a block diagram schematically illustrating a configuration of a predictor in FIG. 1.

FIG. 13 illustrates a detailed configuration of the predictor 101. As described above, the available block information 30, the reference motion information 19, and the reference image signal 17 are input to the predictor 101, and the predictor 101 outputs the predicted image signal 11, the motion information 18, and the selection block information 31. As illustrated in FIG. 13, the motion information selector 118 includes a spatial-direction-motion-information acquiring module 110, a temporal-direction-motion-information acquiring module 111, and a motion information selector switch 112.

The available block information 30 and the reference motion information 19 on the spatial-direction motion reference block are input to the spatial-direction-motion-information acquiring module 110. The spatial-direction-motion-information acquiring module 110 outputs motion information 18A including the motion information possessed by each available block located in the spatial direction and the index value of the available block. In the case that the information in FIG. 11 is input as the available block information 30, the spatial-direction-motion-information acquiring module 110 generates the two motion information outputs 18A. Each motion information output 18A includes the available block and the motion information 19 possessed by the available block.

Figure 14:
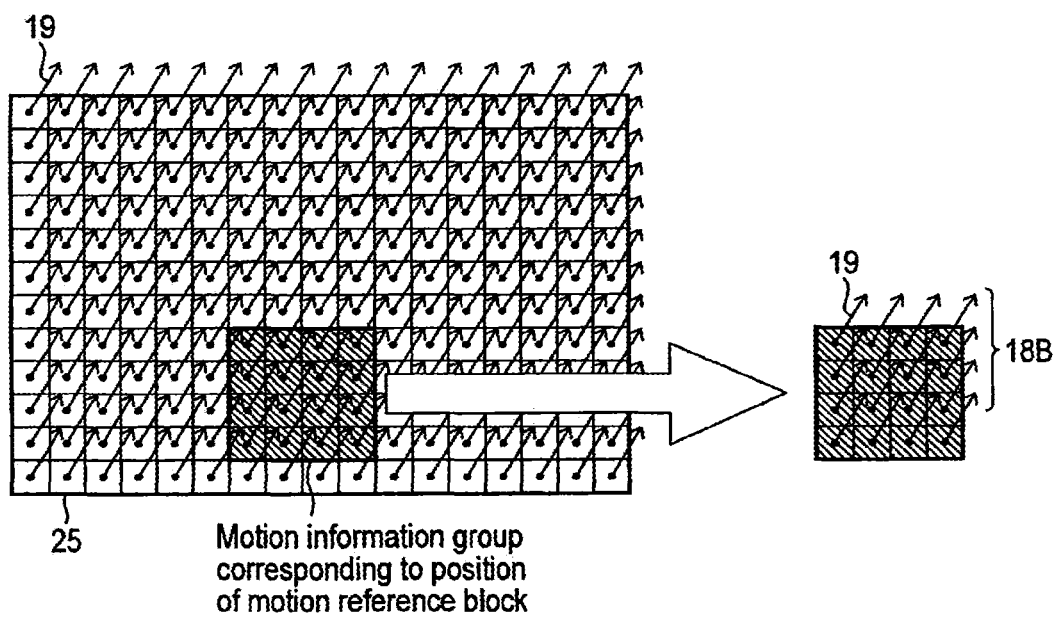
FIG. 14 is a view illustrating a motion information group output by a temporal-direction-motion-information acquiring module in FIG. 13.

The available block information 30 and the reference motion information 19 on the temporal-direction motion reference block are input to the temporal-direction-motion-information acquiring module 111. The temporal-direction-motion-information acquiring module 111 outputs, as motion information 18B, the motion information 19, which is possessed by the available temporal-direction motion reference block identified by the available block information 30, and the index value of the available block. The temporal-direction motion reference block is divided into a plurality of small pixel blocks, and each small pixel block has the motion information 19. As illustrated in FIG. 14, the motion information 18B output by the temporal-direction-motion-information acquiring module 111 includes a group of the pieces of motion information 19 possessed by the small pixel blocks in the available block. In the case that the motion information 18B includes the group of the pieces of motion information 19, the motion compensation prediction can be performed to the encoding target block in units of small pixel blocks into which the encoding target block is divided. In the case that the information in FIG. 11 is input as the available block information 30, the temporal-direction-motion-information acquiring module 111 generates the two motion information outputs 18B. Each motion information output 18B includes the available block and the motion information 19 possessed by the available block.

The temporal-direction-motion-information acquiring module 111 may evaluate an average value or a representative value of the motion vectors included in the motion information 19 possessed by each small pixel block, and output the average value or the representative value of the motion vectors as the motion information 18B.

Based on the pieces of motion information 18A and 18B output from the spatial-direction-motion-information acquiring module 110 and the temporal-direction-motion-information acquiring module 111, the motion information selector switch 112 in FIG. 13 properly selects one available block as the selection block, and outputs the motion information 18 (or the group of the pieces of motion information 18) corresponding to the selection block to the motion compensator 113. The motion information selector switch 112 also outputs the selection block information 31 on the selection block. The selection block information 31 includes the index p or the motion reference block name, and is simply referred to as selection information. The selection block information 31 is not limited to the index p and the motion reference block name, and any information may be used as the selection block information 31 as long as the position of the selection block can be specified.

For example, the motion information selector switch 112 selects the available block, which minimizes an encoding cost derived by a cost equation indicated in the following mathematical formula (1), as the selection block.

$$J = D + \lambda \times R \quad (1)$$

where J indicates the encoding cost and D indicates an encoding strain expressing a sum of squared difference between the input image signal 10 and the reference image signal 17. R indicates a code amount estimated by temporary encoding and λ indicates a Lagrange undetermined coefficient defined by the quantization width. The encoding cost J may be calculated using only the code amount R or the encoding strain D instead of the mathematical formula (1), and a cost function of the mathematical formula (1) may be produced using a value in which the code amount R or the encoding strain D is approximated. The encoding strain D is not limited to the sum of squared difference, and the encoding strain D may be a sum of absolute difference (SAD). Only the code amount related to the motion information 18 may be used as the code amount R. The selection block is not limited to the example in which the available block minimizing the encoding cost is selected as the selection block, and one available block having a value within a range where the encoding cost is at least the minimum may be selected as the selection block.

The motion compensator 113 derives the position of the pixel block, in which the reference image signal 17 is taken out as the predicted image signal, based on the reference motion information (or the motion information group) that is possessed by the selection block selected by the motion information selector 118. In the case that the motion information group is input to the motion compensator 113, the motion compensator 113 acquires the predicted image signal 11 from the reference image signal 17 by dividing the pixel block taken out as the predicted image signal by the reference image signal 17 into small pixel blocks (for example, 4-by-4-pixel blocks) and applying the corresponding motion information to each small pixel block. For example, as illustrated in FIG. 4A, the position of the block in which the predicted image signal 11 is acquired is shifted from the small block in the spatial direction according to the motion vector 18a included in the motion information 18.

Figure 15:
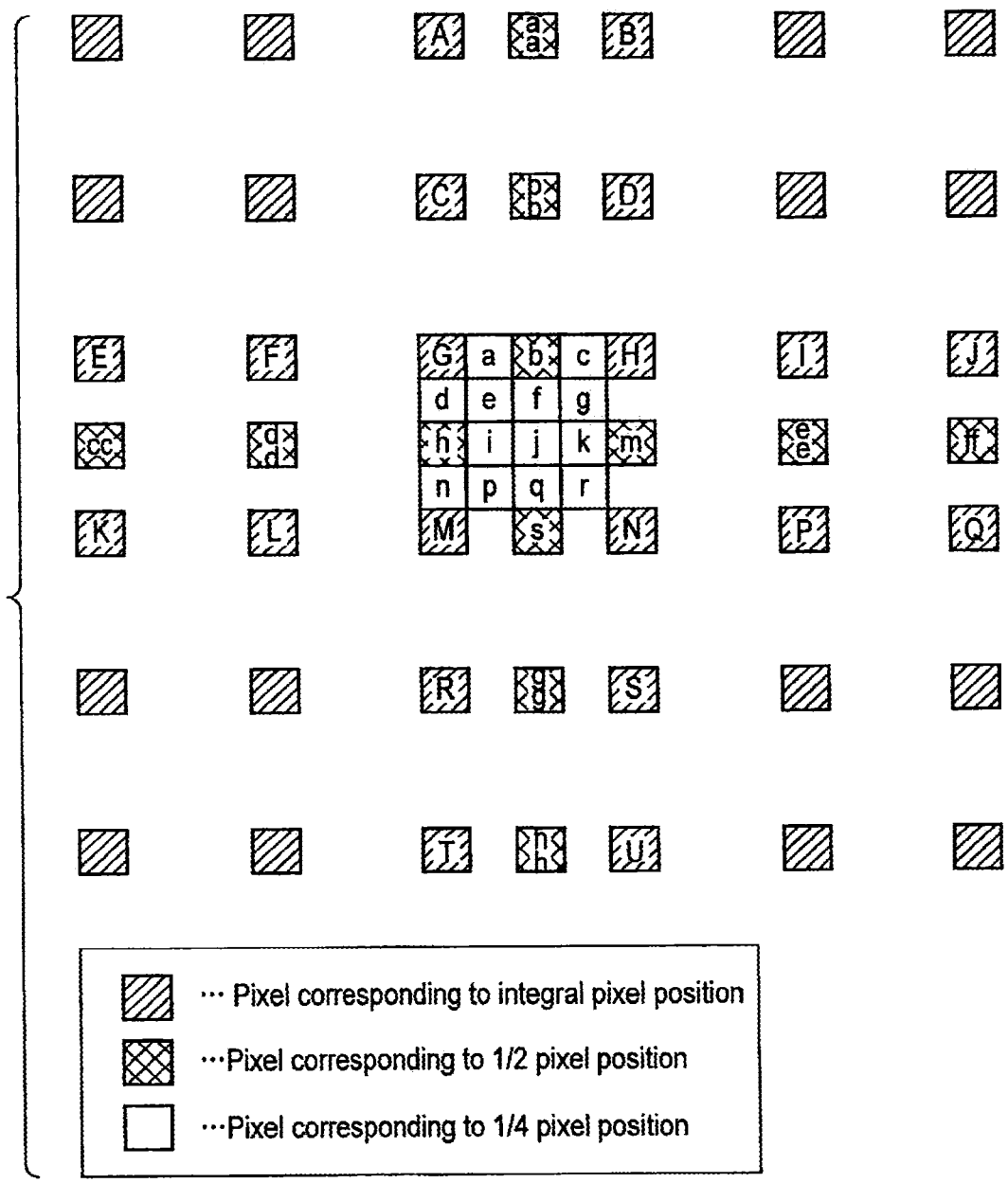
FIG. 15 is an explanatory view illustrating interpolation processing of available decimal pixel accuracy in motion compensation processing performed by a motion compensator in FIG. 13.

The motion compensation processing identical to that of H.264 can be used as the motion compensation processing performed to the encoding target block. An interpolation technique of the ¼ pixel accuracy will specifically be described by way of example. In the interpolation of the ¼ pixel accuracy, the motion vector points out an integral pixel position in the case that each component of the motion vector is a multiple of 4. In other cases, the motion vector points out a predicted position corresponding to an interpolation position of fractional accuracy.

$$x\_pos = x + (mv\_x/4)$$

$$y\_pos = y + (mv\_y/4) \quad (2)$$

where x and y indicate indexes in vertical and horizontal directions of a beginning position (for example, an upper-left top) of the prediction target block, and x_pos and y_pos indicate the corresponding predicted position of the reference image signal 17. (mv_x,mv_y) indicates the motion vector having the ¼ pixel accuracy. A predicted pixel is generated with respect to the determined pixel position through processing of compensating or interpolating the corresponding pixel position of the reference image signal 17. FIG. 15 illustrates an example of the generation of the predicted pixel in H.264. In FIG. 15, a square (a square drawn by oblique lines) indicated by a capital-letter alphabet expresses the pixel in the integral position, and a hatched square expresses the interpolation pixel in the ½ pixel position. A white square expresses the interpolation pixel corresponding to the ¼ pixel position. For example, in FIG. 15, the processing of interpolating ½ pixels corresponding to the positions of the alphabets b and h is calculated by the following mathematical formula (3).

$$b = (E - 5 \times F + 20 \times G + 20 \times H - 5 \times I + J + 16) >> 5$$

$$h = (A - 5 \times C + 20 \times G + 20 \times M - 5 \times R + T + 16) >> 5 \quad (3)$$

Figure 16:
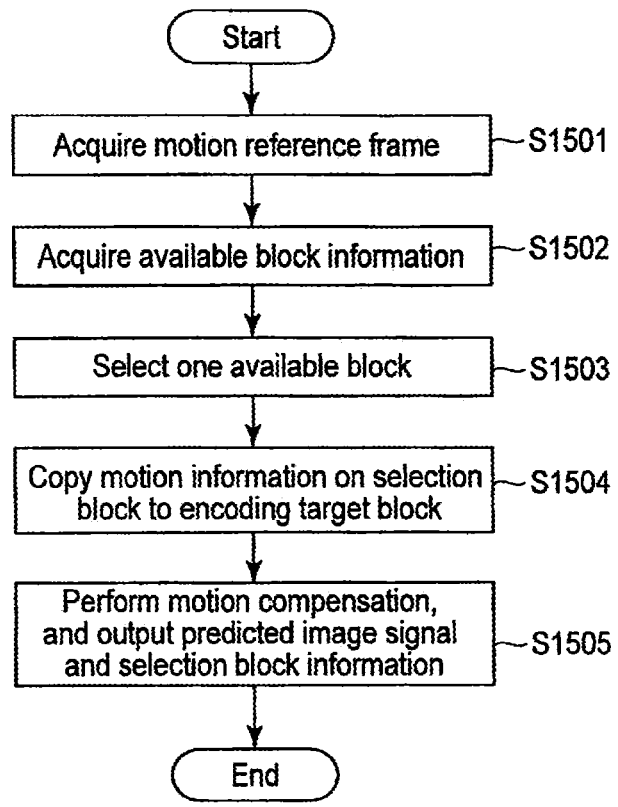
FIG. 16 is a flowchart illustrating an example of an operation of the predictor in
FIG. 13.

The letters (for example, b, h, and C1) indicated in the mathematical formulae (3) and (4) indicate the value of the pixel to which the same letters are provided in FIG. 16. ">>" indicates a right shift calculation, and ">>5" corresponds to a division by 32. That is, the interpolation pixel in the ½ pixel position is calculated with a six-tap FIR (Finite Impulse Response) filter (tap coefficient: (1,−5,20,20,−5,1)/ 32).

For example, in FIG. 15, the processing of interpolating ¼ pixels corresponding to the positions of the letters a and d is calculated by the following mathematical formula 4.

$$a=(G+b+1)\gg 1$$

$$d=(G+h+1)\gg 1 \quad (4)$$

Thus, the interpolation pixel in the ¼ pixel position is calculated with a two-tap average-value filter (tap coefficient: (½,½)). The interpolation processing of a ½ pixel corresponding to the letter j existing in the middle of the four integral pixel positions is generated with six taps in the vertical direction and six taps in the horizontal direction. For other pixel positions, the interpolation pixel value is generated in a similar manner.

The interpolation processing is not limited to the examples of the mathematical formulae (3) and (4), and the interpolation pixel value may be generated using another interpolation coefficient. A fixed value provided from the encoding controller 150 may be used as the interpolation coefficient, or the interpolation coefficient may be optimized in each frame based on the encoding cost and generated using the optimized interpolation coefficient.

In the present embodiment, the motion vector block prediction processing is performed to the motion reference block in units of macroblocks (for example, 16-by-16-pixel blocks). Alternatively, the prediction processing may be performed in units of 16-by-8-pixel blocks, 8-by-16-pixel blocks, 8-by-8-pixel blocks, 8-by-4-pixel blocks, 4-by-8-pixel blocks, or 4-by-4-pixel blocks. In this case, the information on the motion vector block is derived in units of pixel blocks. The prediction processing may be performed in units of 32-by-32-pixel blocks, 32-by-16-pixel blocks, or 64-by-64-pixel blocks, which are larger than 16-by-16-pixel blocks.

When a reference motion vector in the motion vector block is substituted for the motion vector of the small pixel block in the encoding target block, (A) a negative value (inverted vector) of the reference motion vector may be substituted, or (B) a weighted average value, a median, a maximum value, or a minimum value of a reference motion vector corresponding to the small block and reference motion vectors adjacent to the reference motion vector may be substituted.

Figure 17:
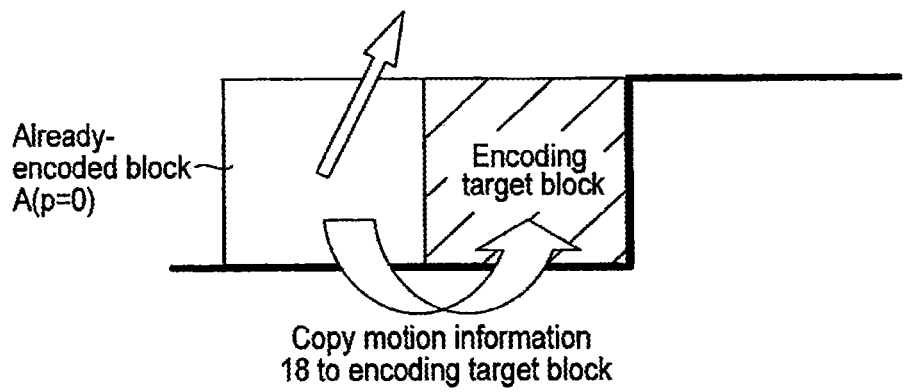
FIG. 17 is a view illustrating a state in which the motion compensator in FIG. 13 copies the motion information on the temporal-direction motion reference block to the encoding target block.

FIG. 16 schematically illustrates an operation of the predictor 101. As illustrated in FIG. 16, the reference frame (motion reference frame) including the temporal-direction motion reference block is acquired (Step S1501). Typically, the motion reference frame is a reference frame having the smallest temporal distance from the encoding target frame, and is a temporally past reference frame. For example, the motion reference frame is a frame that is encoded immediately before the encoding target frame. In another example, any reference frame in which the motion information 18 is retained in the motion information memory 108 may be acquired as the motion reference frame. Each of the spatial-direction-motion-information acquiring module 110 and the temporal-direction-motion-information acquiring module 111 acquires the available block information 30 output from the available-block acquiring module 109 (Step S1502). The motion information selector switch 112 selects one selection block from the available blocks according to, for example, the mathematical formula (1) (Step S1503). The motion compensator 113 copies the motion information possessed by the selected selection block to the encoding target block (Step S1504). At this point, in the case that the selection block is the spatial-direction reference block, the motion information 18 possessed by the selection block is copied to the encoding target block as illustrated in FIG. 17. In the case that the selection block is the temporal-direction reference block, the group of the pieces of motion information 18 possessed by the selection block is copied to the encoding target block together with the positional information. Then the movement compensation is performed using the motion information 18 or the group of the pieces of motion information 18, which is copied by the motion compensator 113, and the predicted image signal 11 and the motion information 18 used in the motion compensation prediction are output.

FIG. 18 illustrates a detailed configuration of the variable length encoder 104. As illustrated in FIG. 18, the variable length encoder 104 includes a parameter encoder 114, a transform coefficient encoder 115, a selection block encoder 116, and a multiplexer 117. Except for the transform coefficient information 13 and the selection block information 31, the parameter encoder 114 encodes parameters, such as prediction mode information, block size information, and quantization parameter information, which are necessary for the decoding, and generates encoded data 14A. The transform coefficient encoder 115 encodes the transform coefficient information 13 to generate encoded data 14B. The selection block encoder 116 refers to the available block information 30, and encodes the selection block information 31 to generate encoded data 14C.

In the case that the available block information 30 includes the index and the availability of the motion reference block corresponding to the index as illustrated in FIG. 19, the unavailable motion reference block is removed from the previously-set motion reference blocks, and only the available motion reference block is transformed into a syntax (stds_idx). In FIG. 19, because the five motion reference blocks are unavailable in the nine motion reference blocks, the syntaxes stds_idx are sequentially allocated to the four available motion reference blocks from 0. In the example in FIG. 19, the selection block information that should be encoded is selected from not the nine motion reference blocks, but the four available blocks. Therefore, the allocated encode amount (bin number) is reduced on average.

FIG. 20 illustrates an example of the code table indicating the syntax stds_idx and binary information (bin) on the syntax stds_idx. As illustrated in FIG. 18, an average bin number necessary to encode the syntax stds_idx is decreased with a decreasing number of available motion reference blocks. For example, in the case that the number of available blocks is 4, the syntax stds_idx can be expressed by three bits or less. The binary information (bin) on the syntax stds_idx may be binarized such that bin number of all the syntaxes stds_idx become identical in each available block number, or the binary information may be binarized by a binarization method defined by previous learning. Alternatively, a plurality of binarization methods are prepared, and the binarization method may adaptively be switched in each encoding target block.

Entropy encoding (for example, fixed length coding, Huffman coding, and arithmetic coding) can be applied to the encoders 114, 115, and 116, and the generated pieces of encoded data 14A, 14B, and 14C are multiplexed and output by the multiplexer 117.

In the present embodiment, the frame that is encoded one frame earlier than the encoding target frame is referred to as the reference frame by way of example. Alternatively, the scaling (or normalization) of the motion vector is performed using the motion vector and the reference frame number in the reference motion information 19 possessed by the selection block, and the reference motion information 19 may be applied to the encoding target block.

The scaling processing will specifically be described with reference to FIG. 21. In FIG. 21, a symbol tc indicates a time distance (POC (number indicating display order) distance) between the encoding target frame and the motion reference frame, and is calculated by the following mathematical formula (5). In FIG. 21, a symbol tr[i] indicates a time distance between the motion reference frame and a frame i referred to by the selection block, and is calculated by the following mathematical formula (6).

$$tc = \text{Clip}(-128, 127, \text{DiffPicOrderCnt}(curPOC, colPOC)) \quad (5)$$

$$tr[i] = \text{Clip}(-128, 127, \text{DiffPicOrderCnt}(colPOC, refPOC)) \quad (6)$$

where curPOC is the POC (Picture Order Count) of the encoding target frame, colPOC is the POC of the motion reference frame, and refPOC is the POC of the frame i referred to by the selection block. Clip(min,max,target) is a clip function. The clip function Clip(min,max,target) outputs min in the case that the target is smaller than min, outputs max in the case that the target is larger than max, and outputs the target in other cases. DiffPicOrderCnt(x,y) is a function that calculates a difference between the POCs.

Assuming that $MVr=(MVr\_x, MVr\_y)$ is the motion vector of the selection block and that $MV=(MV\_x, MV\_y)$ is the motion vector applied to the encoding target block, a motion vector MV is calculated by the following mathematical formula (7).

$$MV\_x = (MVr\_x \times tc + \text{Abs}(tr[i]/2))/tr[i]$$

$$MV\_y = (MVr\_y \times tc + \text{Abs}(tr[i]/2))/tr[i] \quad (7)$$

where Abs(x) is a function that takes out an absolute value of x. In the scaling of the motion vector, the motion vector MVr allocated to the selection block is transformed into the motion vector MV between the encoding target frame and the motion first reference frame.

Another example related to the scaling of the motion vector will be described below.

According to the following mathematical formula (8), a scaling coefficient (DistScaleFactor[i]) is evaluated in each slice or frame with respect to all the time distances tr that can be taken by the motion reference frame. The number of scaling coefficients is equal to the number of frames referred to by the selection block, namely, the number of reference frames.

$$tx = (16384 + \text{Abs}(tr[i]/2))/tr[i]$$

$$\text{DistScaleFactor}[i] = \text{Clip}(-1024, 1023, (tc \times tx + 32)) >> 6 \quad (8)$$

A table may previously be prepared for the calculation of tx in the mathematical formula (8).

In the scaling in each encoding target block, using the following mathematical formula (9), the motion vector MV can be calculated by the multiplication, addition, and the shift calculation.

$$MV\_x = (\text{DistScaleFactor}[i] \times MVr\_x + 128) >> 8$$

$$MV\_y = (\text{DistScaleFactor}[i] \times MVr\_y + 128) >> 8 \quad (9)$$

In the case that the scaling processing is performed, the post-scaling motion information 18 is applied to both the processing of the predictor 101 and the processing of the available-block acquiring module 109. In the case that the scaling processing is performed, the reference frame referred to by the encoding target block becomes the motion reference frame.

Figures 22, 23A, 23B:
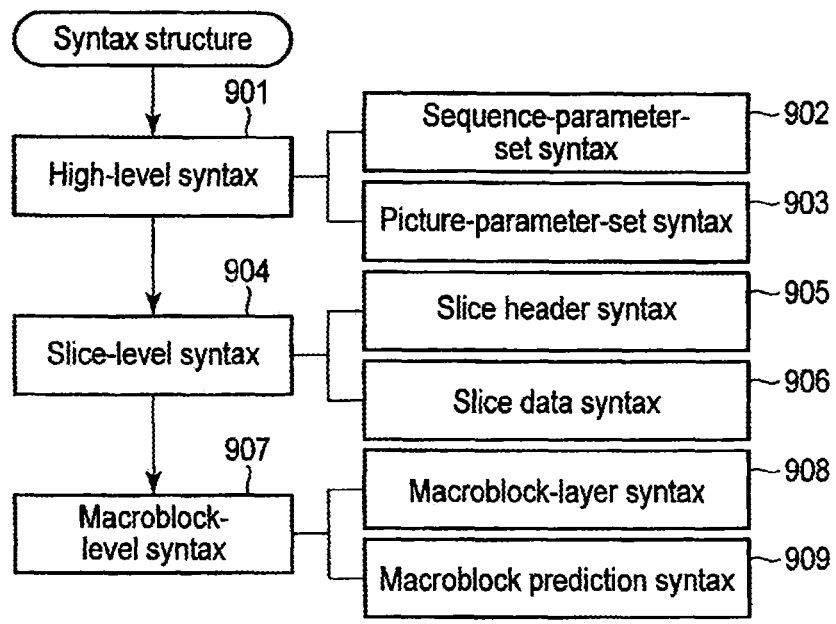
FIG. 22 is a view illustrating a syntax structure of the first embodiment.
FIG. 23A is a view illustrating an example of a macroblock layer syntax of the first embodiment.
FIG. 23B is a view illustrating another example of the macroblock layer syntax of the first embodiment.

FIG. 22 illustrates a syntax structure in the image encoder 100. As illustrated in FIG. 22, the syntax mainly includes three parts, namely, a high-level syntax 901, a slice-level syntax 904, and a macroblock-level syntax 907. The high-level syntax 901 includes syntax information on a layer that is higher than or equal to the slice. The slice-level syntax 904 retains necessary information in each slice, and the macroblock-level syntax 907 retains necessary data in each macroblock in FIGS. 7A to 7D Each of the parts includes a further detailed syntax. The high-level syntax 901 includes sequence-level and picture-level syntaxes, such as a sequence-parameter-set syntax 902 and a picture-parameter-set syntax 903. The slice-level syntax 904 includes a slice header syntax 905 and a slice data syntax 906. The macroblock-level syntax 907 includes a macroblock-layer syntax 908 and a macroblock prediction syntax 909.

FIGS. 23A and 23B illustrate examples of the macroblock-layer syntax. An available_block_num in FIGS. 23A and 23B indicates the number of available blocks. In the case that the available_block_num is larger than 1, it is necessary to encode the selection block information. An stds_idx indicates the selection block information, and the stds_idx is encoded using the code table corresponding to the number of available blocks.

FIG. 23A illustrates the syntax in the case that the selection block information is encoded after an mb_type. The stds_idx is encoded in the case that a mode indicated by the mb_type is a predetermined size or a mode (TARGET_MODE), and in the case that the available_block_num is larger than 1. For example, in the case that the motion information on the selection block is available, and in the case that the block size is 64×64 pixels, 32×32 pixels, or 16×16 pixels, or in the case of the direct mode, the stds_idx is encoded.

FIG. 23B illustrates the syntax in the case that the selection block information is encoded before the mb_type. In the case that the available_block_num is larger than 1, the stds_idx is encoded. In the case that the available_block_num is 0, because the conventional motion compensation typified by H.264 is performed, the mb_type is encoded.

A syntax element that is not defined herein can be inserted in a line space of the table in FIGS. 23A and 23B, and a description related to another conditional branching may be included in the line space. Alternatively, the syntax table may be divided or integrated into a plurality of tables. It is not always necessary to use an identical term, and the term may arbitrarily be changed according to an application mode. Each syntax element described in the macroblock-layer syntax may be changed so as to be clearly described in a macroblock data syntax.

The information on the mb_type can be reduced using the information on the stds_idx. FIG. 24A illustrates the mb_type in the B-slice of H.264 and a code table corresponding to the mb_type. In FIG. 24A, N is a value, such as 16, 32, and 64, which indicates the size of the encoding target block, and M is half the value of N. Accordingly, in the case that the mb_type is 4 to 21, the encoding target block is the rectangular block. In FIG. 24A, L0, L1, and Bi indicate a unidirectional prediction (only a List0 direction), a unidirectional prediction (only a List1 direction), and a bidirectional prediction, respectively. In the case that the encoding target block is the rectangular block, the mb_type includes information indicating which prediction, L0, L1, or Bi is performed to each of the two rectangular blocks in the encoding target block. A symbol B_Sub means that the above processing is performed to each of the four pixel blocks into which the macroblock is divided. For example, in the case that the encoding target block is the 64-by-64-pixel macroblock, the encoding target block is encoded while the mb_type is further allocated to each of the four 32-by-32-pixel blocks into which the macroblock is divided.

At this point, in the case that the selection block indicated by the stds_idx is a Spatial Left (i.e., the pixel block adjacent to the left side of the encoding target block), because the motion information on the pixel block adjacent to the left side of the encoding target block is set to the motion information on the encoding target block, the stds_idx has a meaning equivalent to the performance of the prediction to the encoding target block using the horizontally-long rectangular block indicated by mb_type=4, 6, 8, 10, 12, 14, 16, 18, and 20 in FIG. 24A. In the case that the selection block indicated by the stds_idx is a Spatial Up, because the motion information on the pixel block adjacent to the top of the encoding target block is set to the motion information on the encoding target block, the stds_idx has a meaning equivalent to the performance of the prediction to the encoding target block using the vertically-long rectangular block indicated by mb_type=5, 7, 9, 11, 13, 15, 17, 19, and 21 in FIG. 24A. Accordingly, as illustrated in FIG. 24B, the code table in which the fields of mb_type=4 to 21 in FIG. 24A are reduced can be produced by using the stds_idx. Similarly, the code table in FIG. 24D in which the number of fields of mb_type is reduced can be produced with respect to the mb_type in the P-slice of H.264 and the code table in FIG. 24C corresponding to the mb_type.

The information on the stds_idx may be encoded while included in the information on the mb_type. FIG. 25A illustrates a code table in the case that the information on the stds_idx is included in the information on the mb_type, and an example of the mb_type in the B-slice and the code table corresponding to the mb_type. In FIG. 25A, a symbol B_STDS_X (X=0, 1, and 2) indicates a mode corresponding to the stds_idx, and B_STDS_X is added with the number of available blocks (in FIG. 25A, the number of available blocks is 3). FIG. 25B illustrates another example of the mb_type related to the P-slice. Because the code table in FIG. 25B is similar to the code table in FIG. 25A, the description is omitted.

The order of the mb_type and the binarization method (bin) are not limited to the examples in FIGS. 25A and 25B, and the mb_type may be encoded in a different order by another binarization method. It is not necessary that B_STDS_X and P_STDS_X be successive, and each of B_STDS_X and P_STDS_X may be disposed between the mb_type and the mb_type. The binarization method (bin) may be designed based on a previously-learned selection frequency.

The first embodiment can also be applied to an extended macroblock in which the motion compensation prediction is collectively performed to the plurality of macroblocks. In the first embodiment, the encoding may be performed in any scan order. For example, a line scan and a Z-scan can be applied.

As described above, the image encoding apparatus of the first embodiment selects the available block from the a plurality of motion reference blocks, generates the information identifying the motion reference block applied to the encoding target block according to the number of selected available blocks, and encodes the information. According to the image encoding apparatus of the first embodiment, the motion compensation is performed in units of pixel blocks, each of which is smaller than the encoding target block, while the code amount related to the motion vector information is reduced, so that a high encoding efficiency can be implemented.

Second Embodiment

FIG. 26 is a block diagram schematically illustrating a configuration of an image encoding apparatus according to a second embodiment. A component and an operation, which are different from those of the first embodiment, are mainly described in the second embodiment. As illustrated in FIG. 26, an image encoder 200 of the second embodiment differs from the image encoder 100 of the first embodiment in the configuration of a predictor 201 and a variable length encoder 204. As illustrated in FIG. 27, the predictor 201 includes a first predictor 101 and a second predictor 202, and generates a predicted image signal 11 by selectively switching the first and second predictors 101 and 202. The first predictor 101 has the same configuration as the predictor 101 (shown in FIG. 1) of the first embodiment, and generates the predicted image signal 11 according to a prediction method (a first prediction method) in which the motion compensation is performed using a motion information 18 possessed by the selection block. The second predictor 202 generates the predicted image signal 11 according to a prediction method (a second prediction method), such as H.264, in which the motion compensation is performed to the encoding target block using one motion vector. The second predictor 202 generates a predicted image signal 11B using an input image signal 10 and a reference image signal 17 from a frame memory.

FIG. 28 schematically illustrates an operation of the predictor 202. As illustrated in FIG. 28, the second predictor 202 includes a motion information acquiring module 205 that generates motion information 21 using the input image signal 10 and the reference image signal 17 and a motion compensator 113 (also shown in FIG. 1) that generates a predicted image signal 11A using the reference image signal 17 and the motion information 21. The motion information acquiring module 205 evaluates the motion vector that should be allocated to the encoding target block by, for example, block matching based on the input image signal 10 and the reference image signal 17. A value in which a difference between the input image signal 10 and the post-matching interpolation image is accumulated in each pixel is used as a criterion of the matching.

The motion information acquiring module 205 may decide the optimum motion vector using a value in which a difference between the predicted image signal 11 and the input image signal 10 is transformed. The optimum motion vector may be decided in consideration of the magnitude of the motion vector and the code amounts of the motion vector and the reference frame number, or the optimum motion vector may be decided using the mathematical formula (1). The matching method may be performed based on search range information provided from the outside of the image encoding apparatus, or the matching method may hierarchically be performed in each pixel accuracy level. The motion information provided by the encoding controller 150 may be used as the output 21 of the motion information acquiring module 205 without performing search processing.

The predictor 101 in FIG. 27 further includes a prediction method selector switch 203 that selects and outputs one of the predicted image signal 11A from the first predictor 101 and the predicted image signal 11B from the second predictor 202. For example, according to the mathematical formula (1), the prediction method selector switch 203 evaluates the encoding cost in each of the predicted image signals 11A and 11B using the input image signal 10, and selects one of the predicted image signals 11A and 11B such that the encoding cost is reduced, and outputs the selected predicted image signal as the predicted image signal 11. In addition to the motion information 18 and selection block information 31, the prediction method selector switch 203 also outputs prediction switching information 32 indicating which of the first predictor 101 and the second predictor 202 outputs the predicted image signal 11. The output motion information 18 is encoded by the variable length encoder 204, and then multiplexed into encoded data 14.

FIG. 29 schematically illustrates a configuration of the variable length encoder 204. The variable length encoder 204 in FIG. 29 includes a motion information encoder 217 in addition to the configuration of the variable length encoder 104 in FIG. 18. Unlike the selection block encoder 116 in FIG. 18, a selection block encoder 216 in FIG. 29 encodes the prediction switching information 32 to generate encoded data 14D. In the case that the first predictor 101 performs the prediction processing, the selection block encoder 216 also encodes the available block information 30 and the selection block information 31. The encoded available block information 30 and selection block information 31 are included in the encoded data 14D. In the case that second predictor 202 performs the prediction processing, the motion information encoder 217 encodes the motion information 18 to generate encoded data 14E. Each of the selection block encoder 216 and the motion information encoder 217 determines which of the first predictor 101 and the second predictor 202 performs the prediction processing based on the prediction switching information 32 indicating whether the predicted image is generated by the motion compensation prediction in which the motion information on the selection block is used.

A multiplexer 117 receives pieces of encoded data 14A, 14B, 14D, and 14E from a parameter encoder 114, a transform coefficient encoder 115, the selection block encoder 216, and the motion information encoder 117, and multiplexes the pieces of encoded data 14A, 14B, 14D, and 14E.

FIGS. 30A and 30B illustrate examples of the macroblock layer syntax of the second embodiment. An available_block_num in FIG. 30A indicates the number of available blocks. In the case that the available_block_num is larger than 1, the selection block encoder 216 encodes the selection block information 31. A stds_flag is a flag indicating whether the motion information on the selection block is used as the motion information on the encoding target block in the motion compensation prediction, namely, a flag indicating which of the first predictor 101 and the second predictor 202 is selected by the prediction method selector switch 203. In the case that the number of available blocks is larger than 1 while the stds_flag is 1, the motion information possessed by the selection block is used in the motion compensation prediction. In the case that the stds_flag is 0, while the motion information possessed by the selection block is not used, like H.264 the motion information 18 is directly encoded or the predicted difference value is encoded. An stds_idx indicates the selection block information, and the code table corresponding to the number of available blocks is described above.

FIG. 30A illustrates the syntax in the case that the selection block information is encoded after an mb_type. The stds_flag and the stds_idx are encoded only in the case that a mode indicated by the mb_type is a predetermined size or a mode. For example, in the case that the motion information on the selection block is available and in the case that the block size is 64×64 pixels, 32×32 pixels, or 16×16 pixels, or in the case of the direct mode, the stds_flag and the stds_idx are encoded.

FIG. 30B illustrates the syntax in the case that the selection block information is encoded before the mb_type. For example, in the case that the stds_flag is 1, it is not necessary to encode the mb_type. In the case that the stds_flag is 0, the mb_type is encoded.

As described above, the image encoding apparatus of the second embodiment selectively switches between the first predictor 101 of the first embodiment and the second predictor 202 in which the prediction method, such as H.264, is used such that the encoding cost is reduced, and performs compression encoding of the input image signal. Accordingly, in the image encoding apparatus of the second embodiment, the encoding efficiency is improved compared with the image encoding apparatus of the first embodiment.

Third Embodiment

Figure 31:
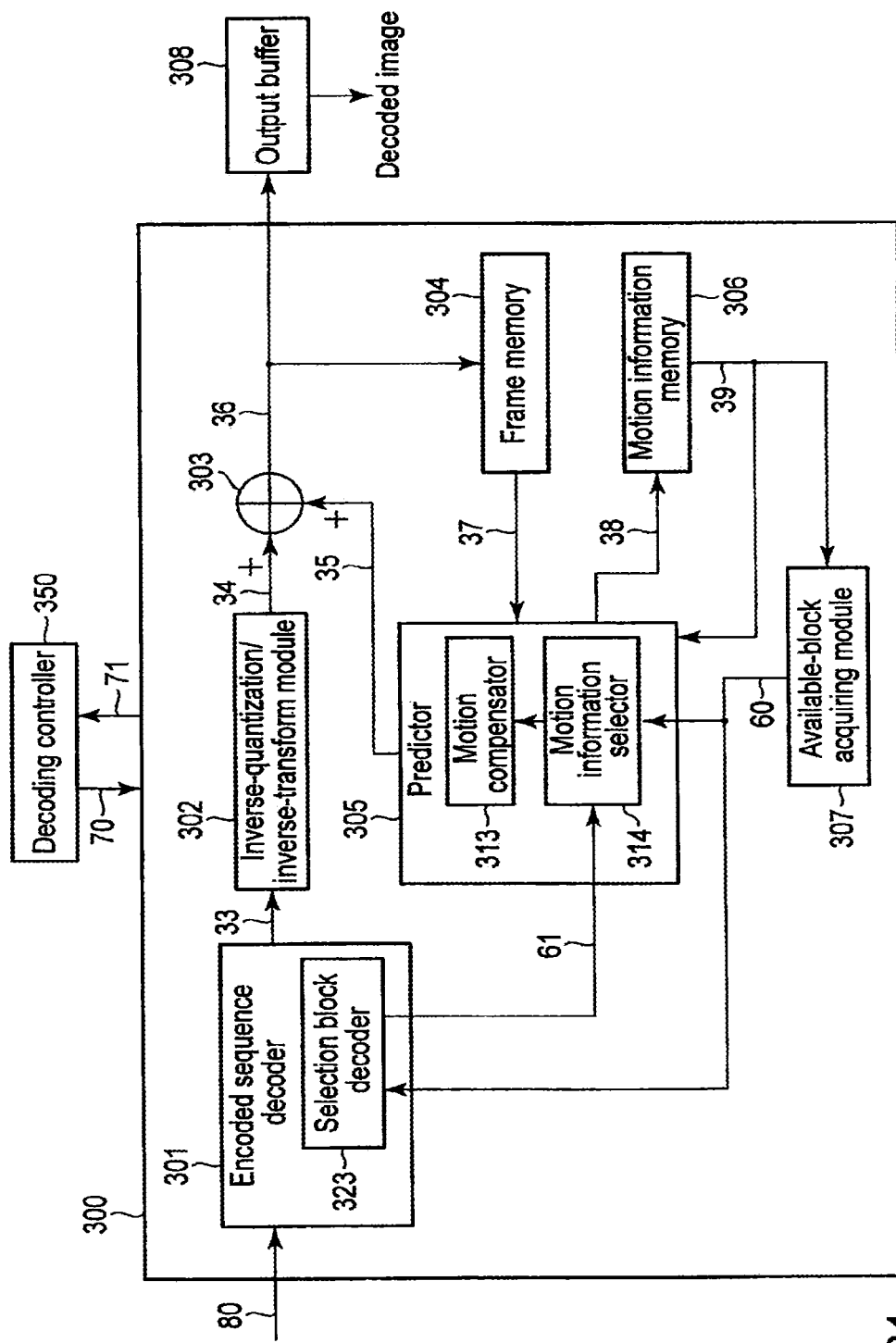
FIG. 31 is a block diagram schematically illustrating an image decoding apparatus according to a third embodiment.

FIG. 31 is a block diagram schematically illustrating an image decoding apparatus according to a third embodiment. As illustrated in FIG. 31, the image decoding apparatus includes an image decoder 300, decoding controller 350, and an output buffer 308. The image decoder 300 is controlled by the decoding controller 350. The image decoding apparatus of the third embodiment corresponds to the image encoding apparatus of the first embodiment. That is, decoding processing performed by the image decoding apparatus in FIG. 31 has a complementary relationship with the encoding processing performed by the image encoder in FIG. 1. The image decoding apparatus in FIG. 31 may be realized by hardware, such as an LSI chip, or realized by causing a computer to execute an image decoding program.

The image decoding apparatus in FIG. 31 includes an encoded sequence decoder 301, an inverse-quantization/inverse-transform module 302, an adder 303, a frame memory 304, a predictor 305, a motion information memory 306, and an available-block acquiring module 307. In the image decoder 300, encoded data 80 from the storage system (not illustrated) or the transmission system (not illustrated) is input to the encoded sequence decoder 301. For example, the encoded data 80 corresponds to the encoded data 14, which is transmitted from the image encoding apparatus in FIG. 1 while multiplexed.

In the third embodiment, the pixel block (for example, the macroblock) that is of the decoding target is simply referred to as a decoding target block. An image frame including the decoding target block is referred to as a decoding target frame.

In the encoded sequence decoder 301, the decoding is performed in each frame or field by a syntax analysis based on the syntax. Specifically, the encoded sequence decoder 301 sequentially performs variable length decoding of an encoded sequence of each syntax, and decodes decoding parameters related to the decoding target block. The decoding parameters include transform coefficient information 33, selection block information 61, and the pieces of prediction information, such as the block size information and the prediction mode information.

In the third embodiment, the decoding parameters include the transform coefficient 33, the selection block information 61, and the prediction information, and the decoding parameters include all the parameters necessary to decode the information on the transform coefficient, the information on the quantization, and the like. The prediction information, the information on the transform coefficient, and the information on the quantization are input as control information 71 to the decoding controller 350. The decoding controller 350 provides the decoding control information 70, which includes the parameters necessary to decode the prediction information, the quantization parameter, and the like, to each module of the image decoder 300.

The encoded sequence decoder 301 decodes the encoded data 80 to obtain the prediction information and the selection block information 61. The motion information 38 including the motion vector and the reference frame number may be not decoded.

The transform coefficient 33 decoded by the encoded sequence decoder 301 is transmitted to the inverse-quantization/inverse-transform module 302. Various pieces of information, namely, the quantization parameter and a quantization matrix which are decoded by the encoded sequence decoder 301 are provided to the decoding controller 350, and loaded on the inverse-quantization/inverse-transform module 302 during the inverse quantization. The inverse-quantization/inverse-transform module 302 inversely quantizes the transform coefficient information 33 according to the loaded information on the quantization, and performs the inverse transform processing (for example, the inverse discrete cosine transform) to generate a prediction error signal 34. The inverse transform processing performed by the inverse-quantization/inverse-transform module 302 in FIG. 31 is an inverse transform of the transform processing performed by the transform/quantization module in FIG. 1. For example, in the case that the image encoding apparatus (FIG. 1) performs the wavelet transform, the inverse-quantization/inverse-transform module 302 performs the corresponding inverse quantization and the corresponding inverse wavelet transform.

The prediction error signal 34 restored by the inverse-quantization/inverse-transform module 302 is input to the adder 303. The adder 303 generates a decoded image signal 36 by adding the prediction error signal 34 and a predicted image signal 35 generated by the predictor 305. The generated decoded image signal 36 is output from the image decoder 300, and temporarily stored in the output buffer 308. Then the decoded image signal 36 is output in output timing managed by the decoding controller 350. The decoded image signal 36 is also stored as a reference image signal 37 in the frame memory 304. The reference image signal 37 is sequentially read in each frame or field from the frame memory 304 and input to the predictor 305.

The available-block acquiring module 307 receives reference motion information 39 from the motion information memory 306, and outputs available block information 60. An operation of the available-block acquiring module 307 is identical to that of the available-block acquiring module 109 (FIG. 1) of the first embodiment.

The motion information memory 306 receives motion information 38 from the predictor 305, and temporarily stores the motion information 38 as the reference motion information 39. The motion information memory 306 temporarily stores the motion information 38 output from the predictor 305 as the reference motion information 39. FIG. 4 illustrates an example of the motion information memory 306. The motion information memory 306 retains a plurality of motion information frames 26 having different decoding times. A group of the pieces of motion information 38 or motion information 38, in which the decoding is ended, is stored as the reference motion information 39 in the motion information frames 26 corresponding to the decoding time. In the motion information frame 26, for example, the reference motion information 39 is stored in units of 4-by-4-pixel blocks. The reference motion information 39 retained by the motion information memory 306 is read and referred to by the predictor 305 in generating the motion information 38 on the decoding target block.

The motion reference block and the available block of the third embodiment will be described below. The motion reference block is a candidate block that is selected from the already-decoded region according to a method previously defined by the image encoding apparatus and the image decoding apparatus. FIG. 8A illustrates an example of the available block. In FIG. 8A, the four motion reference blocks in the decoding target frame and the five motion reference blocks in the reference frame, namely a total of nine motion reference blocks are disposed. The motion reference blocks A, B, C, and D in the decoding target frame in FIG. 8A are adjacent to the left, the top, the upper right, and the upper left of the decoding target block. In the third embodiment, the motion reference block selected from the decoding target frame including the decoding target block is referred to as a spatial-direction motion reference block. A motion reference block TA in the reference frame is located in the same position as the decoding target block, and pixel blocks TB, TC, TD, and TE adjacent to the motion reference block TA are selected as the motion reference blocks. The motion reference block selected from the pixel blocks in the reference frame is referred to as a temporal-direction motion reference block. The frame in which the temporal-direction motion reference block is located is referred to as a motion reference frame.

The spatial-direction motion reference block is not limited to the example in FIG. 8A. For example, as illustrated in FIG. 8B, blocks to which pixels a, b, c, and d adjacent to the decoding target block belong may be selected as the spatial-direction motion reference blocks. In this case, a relative position (dx,dy) of each of the pixels a, b, c, and d is set with respect to the upper-left pixel in the decoding target block as illustrated in FIG. 8C.

As illustrated in FIG. 8D, all blocks A1 to A4, B1, B2, C, and D adjacent to the decoding target block may be selected as the spatial-direction motion reference blocks. In FIG. 8D, there are eight spatial-direction motion reference blocks.

Some of the temporal-direction motion reference blocks TA to TE may be overlapped as illustrated in FIG. 8E, or the temporal-direction motion reference blocks TA to TE may be separated as illustrated in FIG. 8F. The temporal-direction motion reference block is not necessarily located in and around the collocate position, and the temporal-direction motion reference block may be disposed at any position in the motion reference frame. For example, the reference block pointed out by the motion vector included in the motion information may be selected as a center (for example, the block TA) of the motion reference block using the motion information of the already-decoded block adjacent to the decoding target block. It is not always necessary that the temporal-direction reference blocks be disposed at equal intervals.

In the method for selecting the motion reference block, any number of motion reference blocks may be selected, and the motion reference block may be selected from any position, when both the image decoding apparatus and the image decoding apparatus share the pieces of information on the numbers and the positions of the spatial-direction and temporal-direction motion reference blocks. It is not always necessary that the size of the motion reference block be identical to that of the decoding target block. For example, as illustrated in FIG. 8D, the motion reference block may be larger than or smaller than the decoding target block. The motion reference block is not limited to a square shape, and the motion reference block may be a rectangular shape.

The available block will be described below. The available block is a pixel block that is selected from the motion reference blocks, and is a pixel block in which the motion information can be applied to the decoding target block. The available blocks have different pieces of motion information. For example, the available block is selected by performing the available block determination processing in FIG. 9 to the total of nine motion reference blocks in the decoding target frame and the reference frame in FIG. 8A. FIG. 10 illustrates a result of the available block determination processing in FIG. 9. In FIG. 10, the pixel block indicated by the oblique line expresses the unavailable block, and the white block expresses the available blocks. The total of four available blocks, namely, two spatial-direction motion reference blocks and two temporal-direction motion reference blocks are determined to be the available blocks. A motion information selector 314 in the predictor 305 selects one optimum available block as the selection block from the available blocks disposed in the temporal direction and the spatial direction according to the selection block information 61 received from a selection block decoder 323.

The available-block acquiring module 307 will be described below. The available-block acquiring module 307 has the same function as the available-block acquiring module 109 of the first embodiment, acquires the reference motion information 39 from the motion information memory 306, and outputs the available block information 60 that is of the information indicating the available block or the unavailable block in each motion reference block.

An operation of the available-block acquiring module 307 will be described with reference to the flowchart in FIG. 9. The available-block acquiring module 307 determines whether the motion reference block (index p) has the motion information (Step S801). That is, in Step S801, the available-block acquiring module 307 determines whether at least one of the small pixel block in the motion reference block p has the motion information. When the motion reference block p does not have the motion information, namely, when the temporal-direction motion reference block is the block in the I-slice that does not have the motion information or when the intra prediction decoding is performed to all the small pixel blocks in the temporal-direction motion reference block, the flow goes to Step S805. In Step S805, the available-block acquiring module 307 determines that the motion reference block p is the unavailable block.

When the motion reference block p has the motion information in Step S801, the available-block acquiring module 307 selects a motion reference block q (referred to as an available block q) that is already determined to be the available block (Step S802). At this point, q is smaller than p. Then the available-block acquiring module 307 compares the motion information on the motion reference block p to the pieces of motion information on all the available blocks q to determine whether the motion reference block p and the available block q have identical motion information (S803). When the motion vector of the motion reference block p is identical to the motion vector of the motion reference block q, the flow goes to Step S805, and the available-block acquiring module 307 determines that the motion reference block p is the unavailable block in Step S805. When the motion information on the motion reference block p is not identical to the pieces of motion information on all the available blocks q, the available-block acquiring module 307 determines that the motion reference block p is the available block in Step S804.

Whether each motion reference block is the available block or the unavailable block is determined by performing the available block determination processing to all the motion reference blocks, and the available block information 60 is generated. FIG. 11 illustrates an example of the available block information 60. As illustrated in FIG. 11, the available block information 60 includes the index p and the availability of the motion reference block. In FIG. 11, the motion reference blocks having the indexes p of 0, 1, 5, and 8 are selected as the available blocks, and the number of available blocks is 4.

In the case that the intra prediction encoding is performed to at least one of the blocks in the temporal-direction motion reference block p in Step S801 in FIG. 9, the available-block acquiring module 307 may determine that the motion reference block p is the unavailable block. That is, the flow may go to Step S802 only in the case that the inter prediction encoding is performed to all the blocks in the temporal-direction motion reference block p.

FIGS. 12A to 12E illustrate examples in which the determination that the motion information 38 on the motion reference block p is identical to the motion information 38 on the available block q is made in the comparison of the pieces of motion information 38 in Step S803. A plurality of blocks indicated by oblique lines and two white blocks are illustrated in FIGS. 12A to 12E. In FIGS. 12A to 12E, for the sake of convenience, it is assumed that the pieces of motion information 38 on the two white blocks are compared with each other without considering the blocks indicated by oblique lines. It is assumed that one of the two white blocks is the motion reference block p while the other is the motion reference block q (available block q) that is already determined to be available. Either of the two white blocks may be the motion reference block p unless otherwise noted.

FIG. 12A illustrates an example in which both the motion reference block p and the available block q are spatial-direction blocks. In the example in FIG. 12A, the determination that the pieces of motion information 38 are identical to each other is made when the pieces of motion information 38 on blocks A and B are identical to each other. At this point, it is not necessary that the sizes of the blocks A and B be equal to each other.

FIG. 12B illustrates an example in which one of the motion reference block p and the available block q is the spatial-direction block A while the other is the temporal-direction block TB. In FIG. 12B, one block having the motion information exists in the temporal-direction block TB. The determination that the pieces of motion information 38 are identical to each other is made when the motion information 38 on the temporal-direction block TB is identical to the motion information 38 on the spatial-direction block A. At this point, it is not necessary that the sizes of the blocks A and TB be equal to each other.

FIG. 12C illustrates an example in which one of the motion reference block p and the available block q is the spatial-direction block A while the other is the temporal-direction block TB. In FIG. 12C, the temporal-direction block TB is divided into small blocks, and the small blocks have the pieces of motion information 38. In the example in FIG. 12C, the determination that the pieces of motion information 38 are identical to each other is made, when all the blocks having the pieces of motion information 38 have the identical motion information 38, and when the pieces of motion information 38 on the blocks are identical to the motion information 38 on the spatial-direction block A. At this point, it is not necessary that the sizes of the blocks A and TB be equal to each other.

FIG. 12D illustrates an example in which both the motion reference block p and the available block q are the temporal-direction blocks. In this case, the determination that the pieces of motion information 38 are identical to each other is made when the pieces of motion information 38 on the blocks TB and TE are identical to each other.

FIG. 12E illustrates another example in which both the motion reference block p and the available block q are the temporal-direction blocks. In FIG. 12E, the temporal-direction blocks TB and TE are divided into small blocks, and the small blocks having the pieces of motion information 38 exist in each of the temporal-direction blocks TB and TE. In this case, the comparison of the pieces of motion information 38 is performed in each small block in the block, and the determination that the motion information 38 on the block TB is identical to the motion information 38 on the block TE is made when all the small blocks have identical motion information 38.

FIG. 12F illustrates still another example in which both the motion reference block p and the available block q are the temporal-direction blocks. In FIG. 12F, the temporal-direction block TE is divided into small blocks, and the small blocks having the pieces of motion information 38 exist in the block TE. The determination that the pieces of motion information 38 on the blocks TD and TE are identical to each other is made, when all the small blocks having the pieces of motion information 38 have the identical motion information 38 in the block TE, and when the small blocks having the pieces of motion information 38 are identical to the motion information 38 possessed by the block TD.

Thus, whether the motion information 38 on the motion reference block p is identical to the motion information 38 on the available block q is determined in Step S803. In the examples in FIGS. 12A to 12F, one available block q is compared with the motion reference block p. However, in the case that the number of available blocks q is 2 or more, the motion information 38 on the motion reference block p may be compared to the motion information 38 on each available block q. In the case that scaling is applied, the post-scaling motion information 38 becomes the above motion information 38.

The determination that the motion information on the motion reference block p is identical to the motion information on the available block q is not limited to the case that the motion vectors included in the pieces of motion information are identical to each other. For example, when a norm of a difference between the two motion vectors falls within a predetermined range, the motion information on the motion reference block p may be substantially identical to the motion information on the available block q.

Figure 32:
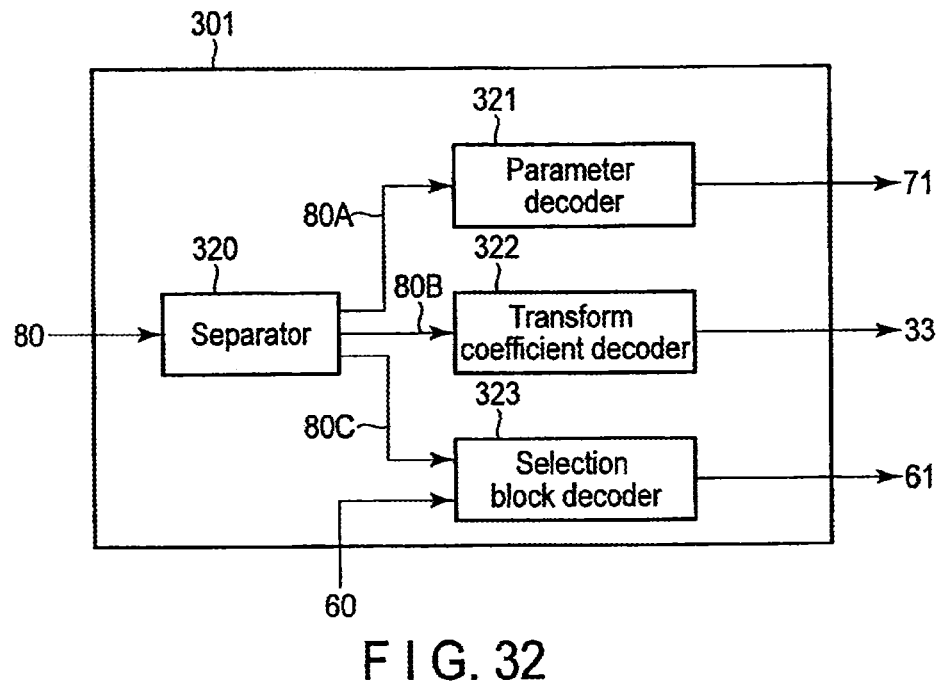
FIG. 32 is a block diagram illustrating detail of an encoded sequence decoder in FIG. 31.

FIG. 32 is a block diagram illustrating the encoded sequence decoder 301 in detail. As illustrated in FIG. 32, the encoded sequence decoder 301 includes a separator 320 that separates the encoded data 80 in units of syntaxes, a parameter decoder 322 that decodes the transform coefficient, a transform coefficient decoder 323 that decodes the selection block information, and a parameter decoder 321 that decodes parameters related to the predicted block size and the quantization.

The parameter decoder 321 receives encoded data 80A including the parameters related to the block size information and the quantization from the separator, and decodes the encoded data 80A to generate the control information 71. The transform coefficient decoder 322 receives the encoded transform coefficient 80B from the separator 320, and decodes the encoded transform coefficient 80B to obtain the transform coefficient information 33. The encoded data 80C related to the selection block and the available block information 60 are input to the selection block decoder 323, and the selection block decoder 323 outputs the selection block information 61. As illustrated in FIG. 11, the input available block information 60 indicates the availability in each motion reference block.

The predictor 305 will be described in detail with reference to FIG. 33.

Figure 33:
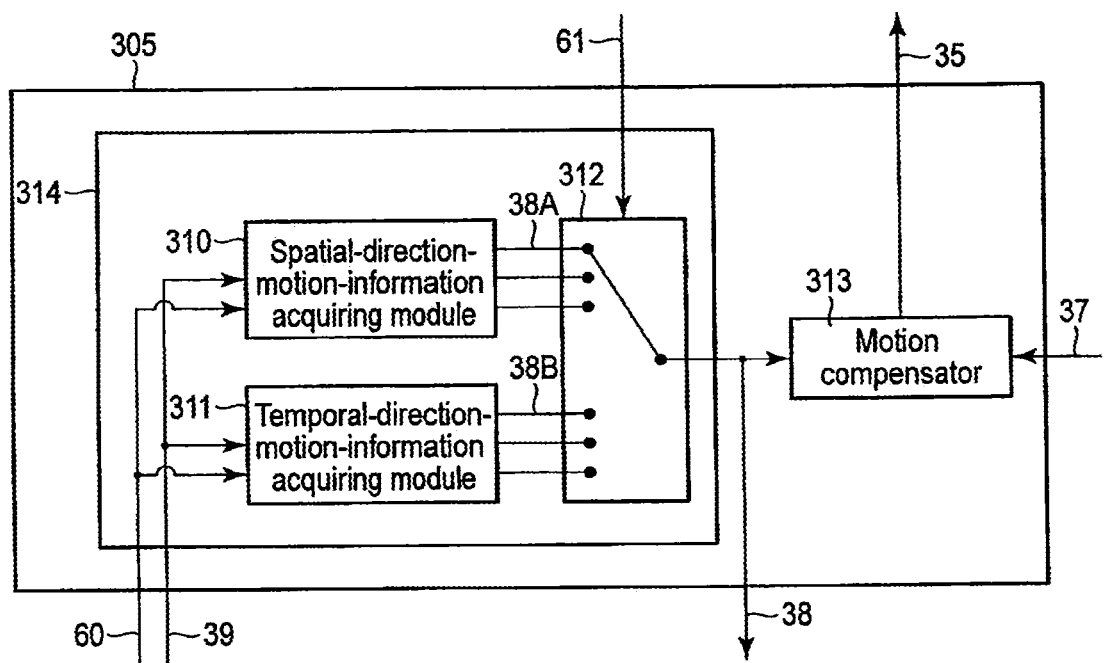
FIG. 33 is a block diagram illustrating detail of a predictor in FIG. 31.

As illustrated in FIG. 33, the predictor 305 includes a motion information selector 314 and a motion compensator 313, and the motion information selector 314 includes a spatial-direction-motion-information acquiring module 310, a temporal-direction-motion-information acquiring module 311, and a motion information selector switch 312. Basically, the predictor 305 has the same configuration and function as the predictor 101 of the first embodiment.

The available block information 60, the selection block information 61, the reference motion information 39, and the reference image signal 37 are input to the predictor 305, and the predictor 305 outputs the predicted image signal 35 and the motion information 38. The spatial-direction-motion-information acquiring module 310 and the temporal-direction-motion-information acquiring module 311 have the same functions as the spatial-direction-motion-information acquiring module 110 and the temporal-direction-motion-information acquiring module 111 of the first embodiment, respectively. Using the available block information 60 and the reference motion information 39, the spatial-direction-motion-information acquiring module 310 generates motion information 38A including the motion information and index of each available block located in the spatial direction. Using the available block information 60 and the reference motion information 39, the temporal-direction-motion-information acquiring module 311 generates motion information 38B including the motion information and index of each available block located in the temporal direction.

The motion information selector switch 312 selects one of the motion information 38A from the spatial-direction-motion-information acquiring module 310 and the motion information (or the motion information group) 38B from the temporal-direction-motion-information acquiring module 311 according to the selection block information 61, and obtains the motion information 38. The selected motion information 38 is transmitted to the motion compensator 313 and the motion information memory 306. According to the selected motion information 38, the motion compensator 313 performs the same motion compensation prediction as the motion compensator 113 of the first embodiment to generate the predicted image signal 35.

Because the motion-vector scaling function of the motion compensator 313 is identical to that of the first embodiment, the description is omitted.

FIG. 22 illustrates a syntax structure in the image decoder 300. As illustrated in FIG. 22, the syntax mainly includes three parts, namely, a high-level syntax 901, a slice-level syntax 904, and a macroblock-level syntax 907. The high-level syntax 901 includes syntax information on a layer that is greater than or equal to the slice. The slice-level syntax 904 retains necessary information in each slice, and the macroblock-level syntax 907 retains necessary data in each macroblock in FIGS. 7A to 7D Each of the parts includes the further detailed syntax. The high-level syntax 901 includes sequence-level and picture-level syntaxes, such as a sequence-parameter-set syntax 902 and a picture-parameter-set syntax 903. The slice-level syntax 904 includes a slice header syntax 905 and a slice data syntax 906. The macroblock-level syntax 907 includes a macroblock-layer syntax 908 and a macroblock prediction syntax 909.

FIGS. 23A and 23B illustrate examples of the macroblock-layer syntax. An available_block_num in FIGS. 23A and 23B indicates the number of available blocks. In the case that the available_block_num is larger than 1, it is necessary to decode the selection block information. An stds_idx indicates the selection block information, and the stds_idx is decoded using the code table corresponding to the number of available blocks.

FIG. 23A illustrates the syntax in the case that the selection block information is decoded after an mb_type. The stds_idx is decoded in the case that a mode indicated by the mb_type is a predetermined size or a mode (TARGET_MODE), and in the case that the available_block_num is larger than 1. For example, in the case that the motion information on the selection block is available and in the case that the block size is 64×64 pixels, 32×32 pixels, or 16×16 pixels, or in the case of the direct mode, the stds_idx is decoded.

FIG. 23B illustrates the syntax in the case that the selection block information is decoded before the mb_type. In the case that the available_block_num is larger than 1, the stds_idx is decoded. In the case that the available_block_num is 0, because the conventional motion compensation typified by H.264 is performed, the mb_type is decoded.

A syntax element that is not defined in the embodiment can be inserted in a line space of the table in FIGS. 23A and 23B, and a description related to another conditional branching may be included in the line space. Alternatively, the syntax table may be divided and integrated into a plurality of tables. It is not always necessary to use the identical term, and the term may arbitrarily be changed according to an application mode. Each syntax element described in the macroblock-layer syntax may be changed so as to be clearly described in a macroblock data syntax.

As described above, the image decoding apparatus of the third embodiment decodes the image that is encoded by the image encoding apparatus of the first embodiment. Accordingly, in the image decoding of the third embodiment, a high-quality decoded image can be reproduced from a relatively small amount of encoded data.

Fourth Embodiment

Figure 34:
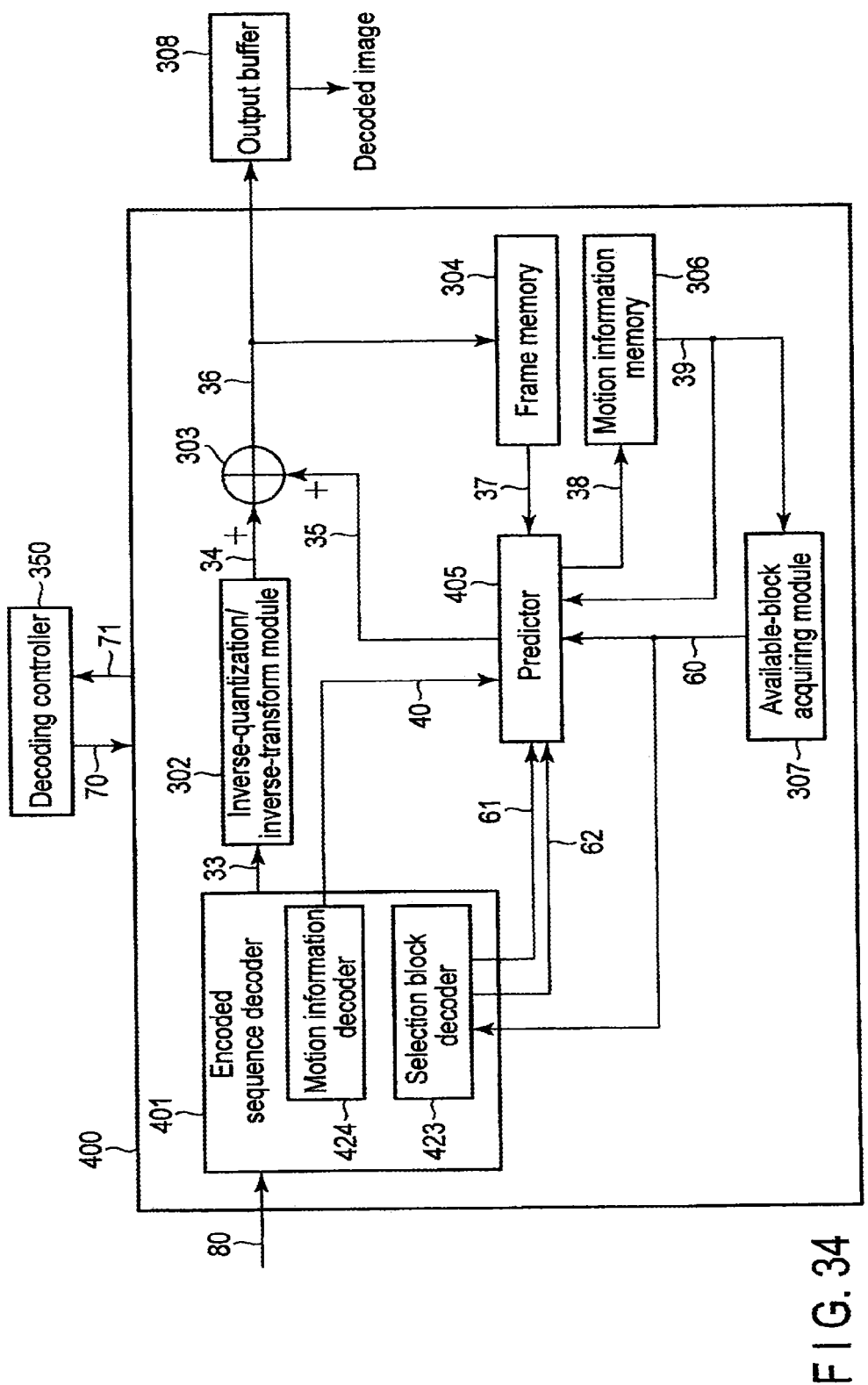
FIG. 34 is a block diagram schematically illustrating an image decoding apparatus according to a fourth embodiment.

FIG. 34 schematically illustrates an image decoding apparatus according to a fourth embodiment. As illustrated in FIG. 34, the image decoding apparatus includes an image decoder 400, decoding controller 350, and an output buffer 308. The image decoding apparatus of the fourth embodiment corresponds to the image encoding apparatus of the second embodiment. A component and an operation, which are different from those of the third embodiment, are mainly described in the fourth embodiment. As illustrated in FIG. 34, the image decoder 400 of the fourth embodiment differs from the image decoder 300 of the third embodiment in an encoded sequence decoder 401 and a predictor 405.

The predictor 405 of the fourth embodiment selectively switches the prediction method (the first prediction method) in which the motion compensation is performed using the motion information possessed by the selection block and the prediction method (the second prediction method), such as H.264, in which the motion compensation is performed to the decoding target block using one motion vector, and generates a predicted image signal 35.

FIG. 35 is a block diagram illustrating the encoded sequence decoder 401 in detail. The encoded sequence decoder 401 in FIG. 35 includes a motion information decoder 424 in addition to the configuration of the encoded sequence decoder 301 in FIG. 32. The selection block decoder 423 in FIG. 35 differs from the selection block decoder 323 in FIG. 32 in that encoded data 80C related to the selection block is decoded to obtain prediction switching information 62. The prediction switching information 62 indicates which of the first prediction method and the second prediction method is used by the predictor 201 in the image encoding apparatus in FIG. 26. In the case that the prediction switching information 62 indicates that the predictor 201 uses the first prediction method, namely, in the case that the decoding target block is encoded by the first prediction method, a selection block decoder 423 decodes the selection block information in the encoded data 80C to obtain selection block information 61. In the case that the prediction switching information 62 indicates that the predictor 201 uses the second prediction method, namely, in the case that the decoding target block is encoded by the second prediction method, the selection block decoder 423 does not decode the selection block information, but the motion information decoder 424 decodes encoded motion information 80D to obtain motion information 40.

FIG. 36 is a block diagram illustrating the predictor 405 in detail. The predictor 405 in FIG. 34 includes a first predictor 305, a second predictor 410, and a prediction method selector switch 411. Using the motion information 40 decoded by the encoded sequence decoder 401 and a reference image signal 37, the second predictor 410 performs the same motion compensation prediction as the motion compensator 313 in FIG. 33, and generates predicted image signal 35B. The first predictor 305 is identical to the predictor 305 of the third embodiment, and generates the predicted image signal 35B. Based on the prediction switching information 62, the prediction method selector switch 411 selects one of the predicted image signal 35B from the second predictor 410 and the predicted image signal 35A from the first predictor 305, and outputs the selected predicted image signal as a predicted image signal 35 of the predictor 405. At the same time, the prediction method selector switch 411 transmits the motion information, which is used in the selected one of the first predictor 305 and the second predictor 410, as motion information 38 to a motion information memory 306.

As to a syntax structure of the fourth embodiment, only differences from that of the third embodiment will mainly be described below.

FIGS. 30A and 30B illustrate examples of the macroblock layer syntax of the fourth embodiment. An available_block_num in FIG. 30A indicates the number of available blocks. In the case that the available_block_num is larger than 1, the selection block decoder 423 decodes the selection block information in the encoded data 80C. A stds_flag is a flag indicating whether the motion information on the selection block is used as the motion information on the decoding target block in the motion compensation prediction, namely, a flag indicating which of the first predictor 305 and the second predictor 410 is selected by the prediction method selector switch 411. In the case that the number of available blocks is larger than 1 while the stds_flag is 1, the motion information possessed by the selection block is used in the motion compensation prediction. In the case that the stds_flag is 0, while the motion information possessed by the selection block is not used, like H.264 the motion information 18 is directly encoded or the predicted difference value is decoded. An stds_idx indicates the selection block information, and the code table corresponding to the number of available blocks is described above.

FIG. 30A illustrates the syntax in the case that the selection block information is decoded after an mb_type. The stds_flag and the stds_idx are decoded only in the case that a mode indicated by the mb_type is a predetermined size or a mode. For example, the stds_flag and the stds_idx are decoded in the case that the block size is 64×64 pixels, 32×32 pixels, or 16×16 pixels, or in the case of the direct mode.

FIG. 30B illustrates the syntax in the case that the selection block information is decoded before the mb_type. For example, in the case that the stds_flag is 1, it is not necessary to decode the mb_type. In the case that the stds_flag is 0, the mb_type is decoded.

As described above, the image decoding apparatus of the fourth embodiment decodes the image that is encoded by the image encoding apparatus of the second embodiment. Accordingly, in the image decoding of the fourth embodiment, a high-quality decoded image can be reproduced from a relatively small amount of encoded data.

According to at least one of the embodiments, the encoding efficiency can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the same effect is obtained in the following modifications of the first to fourth embodiments.

(1) In the first to fourth embodiments, by way of example, the processing target frame is divided into rectangular blocks, such as 16-by-16-pixel blocks, and the encoding or the decoding is sequentially performed from the upper-left pixel block on the screen in FIG. 4 toward the lower-right pixel block. The encoding or decoding order is not limited to the examples of the first to fourth embodiments. For example, the encoding or the decoding may be performed from the lower-right pixel block toward the upper-left pixel block or from the upper-right pixel block toward the lower-left pixel block Alternatively, the encoding and the decoding may be spirally performed from a central portion of the screen toward a peripheral portion or from the peripheral portion of the screen toward the central portion.

(2) In the first to fourth embodiments, a luminance signal and a color-difference signal are not distinguished from each other, but a comprehensive description is made about a color signal component. The luminance signal may be different from the color-difference signal in the prediction processing, or the luminance signal may de identical to the color-difference signal in the prediction processing. In the case that different pieces of prediction processing are used, the prediction method selected for the color-difference signal is encoded and decoded by the same method as the luminance signal.

Various modifications can be made without departing from the scope of the embodiments.

What is claimed is:

1. An image decoding apparatus comprising:
circuitry configured to:
select one or more available blocks from a plurality of candidate blocks positioned in a predetermined positional relationship with respect to a target block, the available blocks including different motion information, the plurality of candidate blocks comprising a first block, a second block, a third block, and a fourth block, the first block being adjacent to a left of the target block, the second block being adjacent to a top of the target block, the third block being adjacent to an upper right of the target block, and the fourth block being adjacent to an upper left of the target block;
decode, from input encoded data, selection information specifying one of the available blocks using a coding table corresponding to a number of the available blocks;
select one available block from the available blocks in accordance with the selection information; and
generate a predicted image of the target block using, as motion information corresponding to the target block, motion information corresponding to the selected available block,
wherein the circuitry is configured to select the one or more available blocks from the plurality of candidate blocks by performing at least (1) determining whether the first block is available, (2) determining whether the second block is available after (1), (3) determining whether the third block is available after (2), and (4) determining whether the fourth block is available after (3).

2. An image decoding method comprising:
selecting one or more available blocks from a plurality of candidate blocks positioned in a predetermined positional relationship with respect to a target block, the available blocks including different motion information, the plurality of candidate blocks comprising a first block, a second block, a third block, and a fourth block, the first block being adjacent to a left of the target block, the second block being adjacent to a top of the target block, the third block being adjacent to an upper right of the target block, and the fourth block being adjacent to an upper left of the target block;
decoding, from input encoded data, selection information specifying one of the available blocks using a coding table corresponding to a number of the available blocks;
selecting one available block from the available blocks in accordance with the selection information; and
generating a predicted image of the target block using, as motion information corresponding to the target block, motion information corresponding to the selected available block,
wherein the selecting the one or more available blocks from the plurality of candidate blocks comprises (1) determining whether the first block is available, (2) determining whether the second block is available after (1), (3) determining whether the third block is available after (2), and (4) determining whether the fourth block is available after (3).

3. An image encoding apparatus comprising:
circuitry configured to:
- select one or more available blocks from a plurality of candidate blocks positioned in a predetermined positional relationship with respect to a target block, the available blocks including different motion information, the plurality of candidate blocks comprising a first block, a second block, a third block, and a fourth block, the first block being adjacent to a left of the target block, the second block being adjacent to a top of the target block, the third block being adjacent to an upper right of the target block, and the fourth block being adjacent to an upper left of the target block;
- select one available block from the available blocks;
- generate a predicted image of the target block based on motion information corresponding to the selected available block; and
- encode selection information specifying the selected available block using a coding table corresponding to a number of the available blocks,
wherein the circuitry is configured to select the one or more available blocks from the plurality of candidate blocks by performing at least (1) determining whether the first block is available, (2) determining whether the second block is available after (1), (3) determining whether the third block is available after (2), and (4) determining whether the fourth block is available after (3).

4. An image encoding method comprising:
- selecting one or more available blocks from a plurality of candidate blocks positioned in a predetermined positional relationship with respect to a target block, the available blocks including different motion information, the plurality of candidate blocks comprising a first block, a second block, a third block, and a fourth block, the first block being adjacent to a left of the target block, the second block being adjacent to a top of the target block, the third block being adjacent to an upper right of the target block, and the fourth block being adjacent to an upper left of the target block;
- selecting one available block from the available blocks;
- generating a predicted image of the target block based on motion information corresponding to the selected available block; and
- encoding selection information specifying the selected available block using a coding table corresponding to a number of the available blocks,
wherein the selecting the one or more available blocks from the plurality of candidate blocks comprises (1) determining whether the first block is available, (2) determining whether the second block is available after (1), (3) determining whether the third block is available after (2), and (4) determining whether the fourth block is available after (3).

* * * * *